US012777425B2

(12) United States Patent
He et al.

(10) Patent No.: US 12,777,425 B2
(45) Date of Patent: Oct. 27, 2026

(54) POWER CONFIGURATION METHOD AND APPARATUS, AND DEVICE

(71) Applicant: Huawei Technologies Co., Ltd., Shenzhen (CN)

(72) Inventors: Yuan He, Nanjing (CN); Dewei Bao, Nanjing (CN); Qikun Wei, Nanjing (CN); Liang Tao, Nanjing (CN); Hao Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 18/673,754

(22) Filed: May 24, 2024

(65) Prior Publication Data

US 2024/0314702 A1 Sep. 19, 2024

Related U.S. Application Data

(63) Continuation of application No. PCT/CN2022/133522, filed on Nov. 22, 2022.

(30) Foreign Application Priority Data

Nov. 27, 2021 (CN) ......................... 202111426730.4

(51) Int. Cl.
*H04B 7/00* (2006.01)
*H04W 52/24* (2009.01)
(Continued)

(52) U.S. Cl.
CPC ....... *H04W 52/241* (2013.01); *H04W 52/242* (2013.01); *H04W 52/40* (2013.01); *H04W 84/12* (2013.01)

(58) Field of Classification Search
CPC ... H04W 52/18; H04W 52/24; H04W 52/241; H04W 52/242; H04W 52/243; H04W 52/245; H04W 52/246; H04W 72/27
See application file for complete search history.

(56) References Cited

U.S. PATENT DOCUMENTS 8,606,501 B2 * 12/2013 Hannah ................ B62B 5/0003 701/472
9,198,121 B2 * 11/2015 Alon .................... H04W 24/00
(Continued)

FOREIGN PATENT DOCUMENTS

CN 101626615 B 2/2012
CN 102378333 B 5/2014
(Continued)

OTHER PUBLICATIONS

IEEE Computer Society: "IEEE Standard for Information technology, Telecommunications and information exchange between systems, Local and metropolitan area networks, Specific requirements Part 11: Wireless LAN Medium Access Control (MAC)and Physical Layer (PHY) Specifications Amendment 1: Radio Resource Measurement of Wireless LANs." IEEE Std 802. 11k-2008, Jun. 12, 2008, 244 pages.

*Primary Examiner* — Tuan Pham
(74) *Attorney, Agent, or Firm* — Conley Rose, P.C.

(57) ABSTRACT

A power configuration method includes determining a power configuration of an access point (AP) based on signal quality data of a station (STA), to ensure coverage experience of the AP. Real coverage experience of the AP may be further obtained based on the signal quality data of the STA, to further optimize the power configuration of the AP.

20 Claims, 9 Drawing Sheets

(51) Int. Cl.
*H04W 52/40* (2009.01)
*H04W 84/12* (2009.01)

(56) References Cited

U.S. PATENT DOCUMENTS

| | | | | |
|---|---|---|---|---|
| 9,560,622 | B2 * | 1/2017 | Gupta .................. | H04W 24/02 |
| 2007/0191044 | A1 | 8/2007 | Kostic et al. | |
| 2012/0039265 | A1 | 2/2012 | Patel et al. | |
| 2023/0027631 | A1 | 1/2023 | Wang et al. | |
| 2023/0345379 | A1 | 10/2023 | Ye et al. | |

FOREIGN PATENT DOCUMENTS

| | | | |
|---|---|---|---|
| CN | 108207021 | A | 6/2018 |
| CN | 108207024 | A | 6/2018 |
| CN | 111901861 | A | 11/2020 |
| CN | 112804742 | A | 5/2021 |
| CN | 113068247 | A | 7/2021 |
| WO | 2021197221 | A | 10/2021 |

* cited by examiner

POWER CONFIGURATION METHOD AND APPARATUS, AND DEVICE

CROSS-REFERENCE TO RELATED APPLICATIONS

This is a continuation of International Patent Application No. PCT/CN2022/133522 filed on Nov. 22, 2022, which claims priority to Chinese Patent Application No. 202111426730.4 filed on Nov. 27, 2021. The disclosures of the aforementioned applications are hereby incorporated by reference in their entireties.

TECHNICAL FIELD

This disclosure relates to the field of communication technologies, and in particular, to a power configuration method and apparatus, and a device.

BACKGROUND

With development of a wireless local area network (WLAN), access points (APs) in a WLAN scenario are deployed more densely. A WLAN controller may be configured to perform centralized management on densely deployed APs. Main challenges faced by centralized management of the APs include radio resource management (RRM). The RRM includes transmit power control (TPC). The TPC obtains an AP path loss topology diagram by using a radio frequency scanning mechanism, and obtains a coverage policy based on a neighbor relationship between the AP and a third neighboring AP. For example, a power value corresponding to a path loss is calculated based on the AP path loss topology diagram. A transmit power value of the AP is adjusted to ensure coverage performance of the AP. A transmit power of the AP is controlled to control co-channel interference between the AP and a neighboring AP to a proper level. In this solution, the AP path loss topology diagram indicates a neighbor relationship between APs, which is used as a power optimization criterion. However, the transmit power of the AP is adjusted based on a path loss value between the APs, so that when the AP sends a signal to a station (STA) by using a specified transmit power, quality of the signal received by the STA may be poor. Consequently, a problem such as weak coverage of the AP may be caused.

SUMMARY

This disclosure provides a power configuration method and apparatus, and a device. In the power configuration method, a power configuration of an AP is adjusted based on signal quality data of a STA, so that a signal quality requirement of the STA can be better matched, and coverage performance of the AP is improved.

According to a first aspect, this disclosure provides a power configuration method. The method is performed by a management device, may be performed by a component (for example, a processor, a chip, or a chip system) of the management device, or may be implemented by a logical module or software that can implement all or some functions of the management device. The management device obtains a first measurement parameter based on a first data set, obtains an adjusted target parameter based on the first measurement parameter and a target parameter, obtains a second power configuration based on the adjusted target parameter, and applies the second power configuration to a first access point set. The first data set includes signal quality data of a terminal device associated with each access point in the first access point set when a first power configuration is applied to the first access point set. The first power configuration is obtained based on the target parameter.

According to the method, after applying the first power configuration, the management device obtains actual signal quality of the terminal device associated with the access point that works based on the first power configuration, and adjusts the target parameter and power configuration of an access point set based on the actual signal quality. Therefore, the power configuration adjusted by using the method can better match a signal quality requirement of the terminal device. In addition, the target parameter (for example, the target parameter is an expected signal fulfillment rate) is adjusted based on the actual signal quality of the terminal device associated with an AP, which helps further optimize the power configuration of the AP.

In a possible implementation, the first power configuration is obtained based on a second data set, an initial power configuration, and the target parameter. The second data set includes signal quality data of the terminal device associated with each access point in the first access point set when the initial power configuration is applied to the first access point set. According to the method, the management device may optimize the power configuration of the AP through collecting data and setting the target parameter.

In a possible implementation, the first measurement parameter indicates a ratio of a quantity of pieces of data in the first data set that is greater than preset signal quality data to a quantity of pieces of data in the first data set. For example, the signal quality data may be a downlink signal strength value. If a quantity of downlink signal strength values in the first data set that are greater than a preset downlink signal strength value is a, and a total quantity of downlink signal strength values in the first data set is b, the first measurement parameter is a/b, that is, the first measurement parameter may be a signal fulfillment rate.

In a possible implementation, the management device obtains the adjusted target parameter based on the first measurement parameter, the target parameter, and the quantity of pieces of data in the first data set. According to the method, the management device may adjust the target parameter based on the first measurement parameter, which helps further optimize the power configuration of the AP.

In a possible implementation, the adjusted target parameter is obtained by performing linear weighting on the first measurement parameter and the target parameter based on a weighting coefficient. The weighting coefficient is obtained based on the quantity of pieces of data in the first data set. In this method, the target parameter is adjusted in an easy-to-implement manner.

In a possible implementation, the second power configuration is obtained based on a path loss value corresponding to the adjusted target parameter and the preset signal quality data.

In a possible implementation, the management device obtains a second measurement parameter based on a third data set. The management device applies a third power configuration to a second access point set when the second measurement parameter does not reach a standard. The third data set includes signal quality data of the terminal device associated with each access point in the first access point set when the second power configuration is applied to the first access point set. The third power configuration is obtained based on the third data set, the second power configuration, and the adjusted target parameter. The first access point set includes the second access point set. The second access point set is less than or equal to the first access point set. The second access point set includes one or more access points.

According to the method, when the actual signal quality of some APs in a network does not reach the standard, the management device may implement local power configuration optimization, thereby implementing a quick response to power configuration optimization.

In a possible implementation, the management device obtains the target parameter through a human-computer interaction interface. This method provides a portable manner for an administrator to input a target parameter, which is helpful in optimizing a power configuration policy.

According to a second aspect, this disclosure provides a power configuration method. The method is performed by a management device, may be performed by a component (for example, a processor, a chip, or a chip system) of the management device, or may be implemented by a logical module or software that can implement all or some functions of the management device. When the management device applies a first power configuration to a first access point set, the management device obtains signal quality data of a terminal device associated with each access point in the first access point set, and applies a second power configuration to the first access point set based on the signal quality data of the terminal device associated with each access point in the first access point set. The management device applies a third power configuration to a second access point set when signal quality of a terminal device associated with at least one access point in the first access point set does not reach a standard. The second access point set includes at least one access point.

In this solution, the management device first applies power configuration, then adjusts the power configuration based on actual signal quality of the terminal device, and then performs local power optimization based on degradation of the signal quality of a local terminal device. Therefore, the method provides a power configuration optimization solution, and a power configuration adjusted in the solution can better match a signal quality requirement of the terminal device. Further, in this solution, the power configuration may locally optimize the power configuration, thereby implementing a quick response to power configuration optimization.

According to a third aspect, this disclosure provides a power configuration apparatus. The power configuration apparatus includes an obtaining unit and an application unit.

The obtaining unit is configured to obtain a first measurement parameter based on a first data set. The first data set includes signal quality data of a terminal device associated with each access point in the first access point set when a first power configuration is applied to the first access point set. The first power configuration is obtained based on a target parameter.

The obtaining unit is further configured to obtain an adjusted target parameter based on the first measurement parameter and the target parameter.

The application unit is configured to apply a second power configuration to the first access point set. The second power configuration is obtained based on the adjusted target parameter.

In a possible implementation, the first power configuration is obtained based on a second data set, an initial power configuration, and the target parameter. The second data set includes signal quality data of the terminal device associated with each access point in the first access point set when the initial power configuration is applied to the first access point set.

In a possible implementation, the first measurement parameter indicates a ratio of a quantity of pieces of data in the first data set that is greater than preset signal quality data to a quantity of pieces of data in the first data set.

In a possible implementation, the obtaining unit is configured to obtain the adjusted target parameter based on the first measurement parameter, the target parameter, and the quantity of pieces of data in the first data set.

In a possible implementation, the adjusted target parameter is obtained by performing linear weighting on the first measurement parameter and the target parameter based on a weighting coefficient. The weighting coefficient is obtained based on the quantity of pieces of data in the first data set.

In a possible implementation, the second power configuration is obtained based on a path loss value corresponding to the adjusted target parameter and the preset signal quality data.

In a possible implementation, the obtaining unit is further configured to obtain a second measurement parameter based on a third data set. The application unit is further configured to apply a third power configuration to a second access point set when the second measurement parameter does not reach a standard.

A third data set includes signal quality data of the terminal device associated with each access point in the first access point set when the second power configuration is applied to the first access point set. The first access point set includes the second access point set. The second access point set is less than or equal to the first access point set. The second access point set includes one or more access points. The third power configuration is obtained based on the third data set, the second power configuration, and the adjusted target parameter.

In a possible implementation, the obtaining unit is further configured to obtain the target parameter through a human-computer interaction interface.

According to a fourth aspect, this disclosure provides a power configuration apparatus. The power configuration apparatus includes an obtaining unit and an application unit.

The application unit is configured to apply a first power configuration to a first access point set.

The obtaining unit is configured to obtain signal quality data of a terminal device associated with each access point in the first access point set.

The application unit is further configured to apply a second power configuration to the first access point set based on the signal quality data of the terminal device associated with each access point in the first access point set.

The application unit is further configured to apply a third power configuration to a second access point set when signal quality of a terminal device associated with at least one access point in the first access point set does not reach a standard. The second access point set includes the at least one access point.

According to a fifth aspect, this disclosure provides an electronic device. The electronic device includes a processor and a memory. The memory is coupled to the processor. The processor is configured to execute a computer program stored in the memory to implement the method implemented in the first aspect or any possible implementation of the first aspect, or the method implemented in the second aspect.

According to a sixth aspect, this disclosure provides a computer-readable storage medium. The computer-readable storage medium stores a computer program. When the computer program is executed by a processor, the method implemented in the first aspect or any possible implementation of the first aspect, or the method implemented in the second aspect is implemented.

According to a seventh aspect, this disclosure provides a computer program product including instructions. When the instructions are run on a computer, the computer is enabled to perform the method according to any one of the first aspect, the second aspect, or the possible implementations of the first aspect or the second aspect.

DESCRIPTION OF EMBODIMENTS

Figure 1:
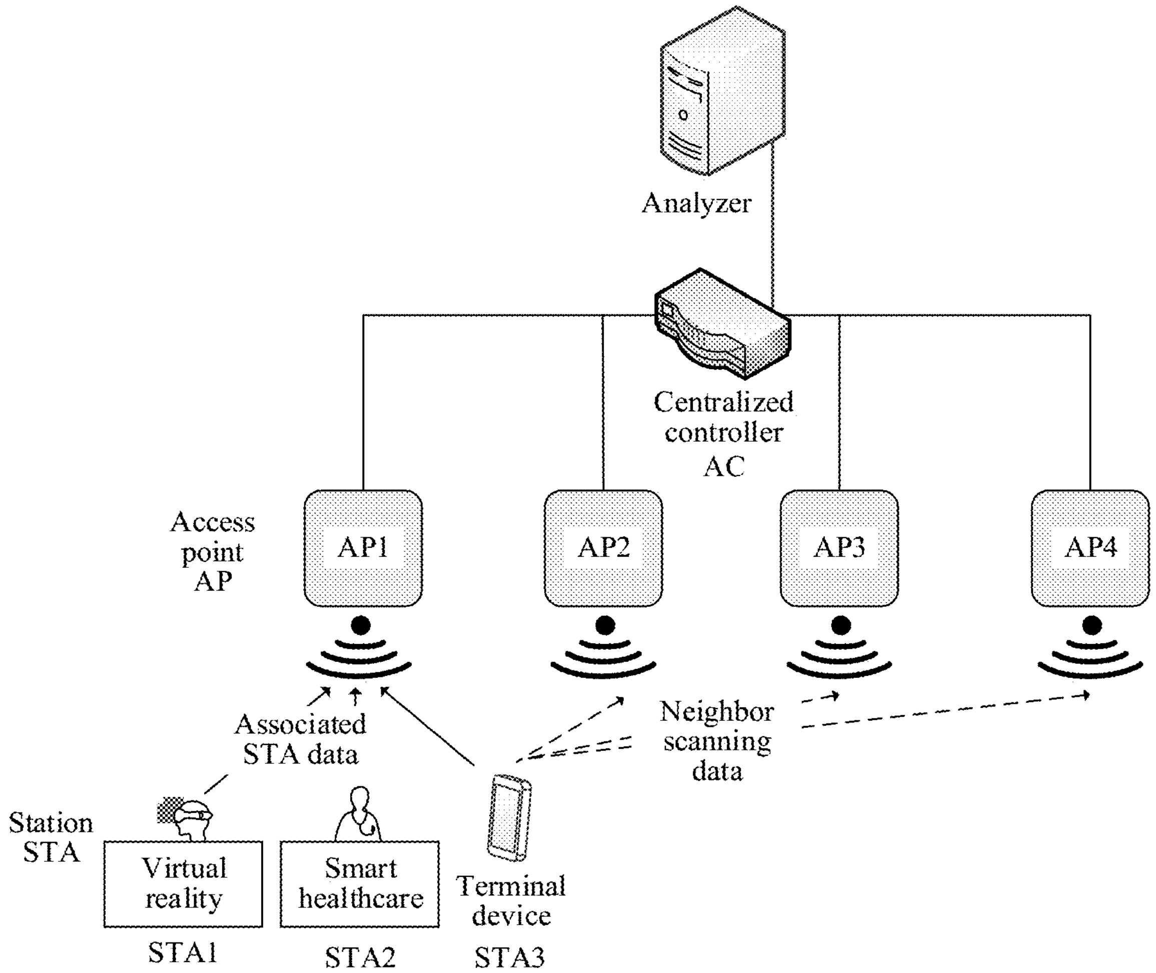
FIG. 1 is a schematic diagram of a WLAN network according to an embodiment of this disclosure.

A wireless communication system includes a communication device, and the communication devices may perform wireless communication through an air interface resource. The communication device may include a network device and a terminal device, and the network device may also be referred to as a network-side device. The air interface resource may include at least one of a time domain resource, a frequency domain resource, a code resource, and a spatial resource. In this disclosure, "at least one" may also be described as "one or more", and "a plurality of" may be two, three, four, or more. This is not limited in this disclosure.

In this disclosure, "/" may indicate an "or" relationship between associated objects. For example, A/B may represent A or B. The term "and/or" may be used to describe existence of three relationships between the associated objects. For example, A and/or B may represent the following three cases: only A exists, both A and B exist, and only B exists, where A and B may be singular or plural. To facilitate description of the technical solutions of this disclosure, in this disclosure, words such as "first" and "second" may be used to distinguish between technical features having a same or similar function. The words such as "first" and "second" do not limit a quantity and an execution sequence. The words such as "first" and "second" do not indicate a definite difference. In this disclosure, the words such as "example" or "for example" is used to represent an example or description. Any embodiment or design scheme described as an "example" or "for example" in embodiments of this disclosure should not be explained as being more preferred or having more advantages than another embodiment or design scheme. Use of the words such as "example" or "for example" is intended to present a related concept in a specific manner for ease of understanding.

The following describes the technical solutions in embodiments of this disclosure with reference to the accompanying drawings in embodiments of this disclosure.

With development of a WLAN, APs in a WLAN scenario are deployed more densely. A WLAN controller may be configured to perform centralized management on densely deployed APs. Main challenges faced by centralized management of the AP include RRM. The RRM includes dynamic channel assignment (DCA), dynamic bandwidth selection (DBS), and TPC.

A core goal of the TPC is to adaptively adjust a transmit power of the AP based on indoor environment or network planning, to ensure optimal coverage performance while controlling co-channel interference between the APs. In a possible implementation, the TPC obtains an AP path loss topology diagram by using a radio frequency scanning mechanism, and obtains a coverage policy based on a neighbor relationship between the AP and a neighboring AP. For example, a power value corresponding to the path loss is calculated based on the AP path loss topology diagram. The transmit power of the AP is adjusted to ensure coverage performance of the AP. The transmit power of the AP is controlled to control the co-channel interference between the AP and the neighboring AP to a proper level. However, the transmit power of the AP is adjusted based on a path loss value between the APs, so that when the AP sends a downlink signal to a STA by using a specified transmit power, quality of the signal received by the STA may be relatively poor. Consequently, a problem such as weak coverage of the AP may be caused. In addition, this TPC solution does not consider the impact of AP height and ceiling on attenuation of the downlink signal of the AP in scenarios such as high-mounting AP, ceiling AP, blocking AP, and cross-wall covering AP. That is, the path loss value between the APs detected by using the TPC solution cannot represent a real AP coverage situation. Consequently, quality of a signal received by a STA associated with the AP is relatively poor, and a power configuration needs to be manually modified to fill a remaining coverage risk. Therefore, the TPC solution cannot match a signal quality requirement of the STA, and also increases hidden network optimization costs.

In view of this, this disclosure provides a power configuration method. In the power configuration method, the power configuration of the AP is adjusted based on signal quality data of the STA, so that the signal quality requirement of the STA can be better matched, and the coverage performance of the AP is improved. In addition, in the power configuration method, actual coverage situation of the AP may be obtained based on the signal quality data of the STA, to further optimize the power configuration of the AP.

The power configuration method provided in this embodiment of this disclosure may be applied to a WLAN network. For example, FIG. 1 is a schematic diagram of a WLAN network according to an embodiment of this disclosure. The WLAN network includes an analyzer, a WLAN controller, an AP, and a STA. The analyzer is configured to obtain signal quality data of the STA, to adjust power configuration of the AP based on the signal quality data of the STA. The WLAN controller is configured to perform unified management on APs in the WLAN network, for example, sending a configuration to the AP, and performing radio frequency resource management and user access control on the AP. The AP is configured to provide a WLAN signal to the STA, and the STA accesses the network by accessing the AP. One AP can be associated with a plurality of STAs. The STA may send, to the AP, signal quality data used to represent the WLAN signal received by the STA. The signal quality data may include signal quality data (associated STA data shown in FIG. 1) of the WLAN signal provided by the AP to the STA, and may further include signal quality data (neighbor scanning data shown in FIG. 1) of a WLAN signal provided by a neighboring AP deployed around the AP to the STA. It may be understood that FIG. 1 is merely an example. A quantity of WLAN controllers, APs, or STAs is not limited in this disclosure.

In this embodiment of this disclosure, the analyzer may be an independent device, may be a cloud device (for example, a cloud server), or may be a module integrated into the WLAN controller.

In embodiments of this disclosure, the STA may be a terminal device. The terminal device may also be referred to as a terminal, a user equipment (UE), a mobile station, a mobile terminal, or the like. The terminal may be widely applied to various scenarios, for example, device-to-device (D2D), vehicle to everything (V2X) communication, machine-type communication (MTC), Internet of things (IoT), virtual reality, augmented reality, industrial control, self-driving, telemedicine, smart grid, smart furniture, smart office, smart wearable, smart transportation, and smart city. The terminal may be a mobile phone, a tablet computer, a computer with a wireless transceiver function, a wearable device, a vehicle, an unmanned aerial vehicle, a helicopter, an airplane, a ship, a robot, a robot arm, a smart home device, or the like. A specific technology and a specific device form that are used by the terminal device are not limited in embodiments of this disclosure. It should be noted that in this embodiment of this disclosure, a function of the terminal device may also be performed by a module (for example, a chip or a modem) in the terminal device, or may be performed by an apparatus including a function of the terminal device.

The following describes in detail the method in embodiments of this disclosure.

Figure 2:
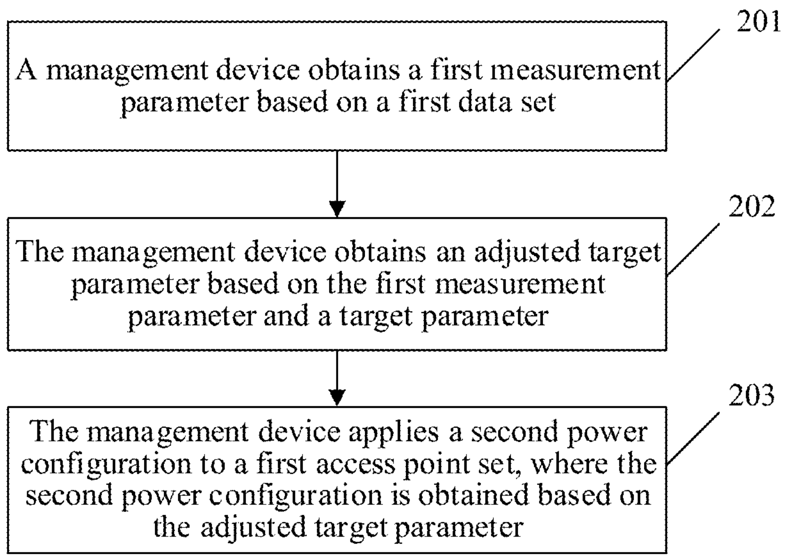
FIG. 2 is a schematic flowchart of a power configuration method according to an embodiment of this disclosure.

FIG. 2 is a schematic flowchart of a power configuration method according to an embodiment of this disclosure. The method is performed by a management device. The method includes the following steps.

201. The management device obtains a first measurement parameter based on a first data set.

The first data set includes signal quality data of a terminal device associated with each access point in the first access point set when a first power configuration is applied to the first access point set. That is, the first data set indicates actual signal quality of the terminal device associated with each access point in the first access point set when the first power configuration is applied to the first access point set.

The first access point set includes one or more access points, and each access point may be associated with one or more terminal devices. The terminal device may support the 802.11k protocol, so that the terminal device can send the signal quality data to the access point. Alternatively, the terminal device sends the signal quality data to the access point based on another preset protocol. Alternatively, the access point may directly measure the signal quality data of the terminal device, to obtain the signal quality data of the terminal device. For example, the WLAN network shown in FIG. 1 includes a WLAN controller. The WLAN controller manages and controls four APs, which are respectively an AP1 to an AP4. The first access point set may be all APs managed and controlled by the WLAN controller, that is, the first access point set includes the AP1 to the AP4. Alternatively, the first access point set may be an AP set that is set by an operation and maintenance engineer, for example, the first access point set includes the AP1 to the AP3.

Data in the first data set is used to represent the actual signal quality of the terminal device associated with each access point in the first access point set. The data in the first data set may be downlink signal strength (for example, a received signal strength indication (RSSI)), a path loss value, a signal to interference plus noise ratio (SINR), or the like. This is not limited herein. When the terminal device sends the data to the AP based on the 802.11k protocol, the data may be carried in a TPC report field of the 802.11 protocol. For example, a received channel power indication (RCPI) in the TPC report field carries receive power of the terminal device, so that the management device may obtain the RSSI or the path loss value based on conversion of an RCPI field value. When the terminal device sends the data to the AP based on a preset protocol, the terminal device and the management device may transmit the data based on a specified field of the preset protocol, for example, the receive power, the RSSI, the path loss value, or the SINR.

The first access point set includes one or more access points, and each access point may be associated with one or more terminal devices. In this case, the first data set may include the signal quality data of a plurality of terminal devices. Further, the signal quality data of each terminal device may include signal quality data collected by the terminal device at different moments. Each piece of data included in the first data set may further include a media access control (MAC) address and a timestamp. The MAC address indicates a MAC address of the terminal device corresponding to the data. The timestamp is used to identify a time at which the terminal device collects the data.

Using an example in which the data in the first data set is the downlink signal strength the first data set includes downlink signal strength data of the plurality of terminal devices associated with a plurality of access points. With reference to the WLAN network shown in FIG. 1, the first access point set includes the AP1 to the AP4. If only the AP1 is associated with terminal devices STA1 to STA3, the first data set includes downlink signal strength data of the STA1 to the STA3. If the AP in the first access point set is further associated with another STA, the first data set further includes downlink signal strength data of the other STA. For one of the STAs, for example, downlink signal strength data of STA1 is arranged in a descending order as follows: −58, −60, −62, −64, −66, −68, −70, −72, −74, and −76 (a unit is decibel relative to one milliwatt (dBm), and the unit of downlink signal strength data in the following examples is dBm). Further, for example, MAC addresses corresponding to the downlink signal strength data −58, −60, −62, −64, −66, −68, −70, −72, −74, and −76 of the STA1 are the MAC addresses of the STA1. For example, the timestamp corresponding to the downlink signal strength data −58 is t1, the timestamp corresponding to the downlink signal strength data −60 is t2, the timestamp corresponding to the downlink signal strength data −62 is t3, and so on. In other words, each piece of downlink signal strength data in the first data set is corresponding to a MAC address and a timestamp.

The first power configuration is obtained based on a target parameter. Further, the first power configuration is obtained based on a second data set, an initial power configuration, and the target parameter. The second data set includes signal quality data of the terminal device associated with each access point in the first access point set when the initial power configuration is applied to the first access point set. For example, the management device determines the initial power configuration based on the path loss topology relationship of each access point in the first access point set. When the management device applies the initial power configuration to each access point in the first access point set, each access point in the first access point set obtains signal quality data of an associated terminal device (that is, obtains the second data set). It may be understood that a type of data in the second data set is the same as a type of data in the first data set. For example, if the data in the first data set is the RSSI, the data in the second data set is also the RSSI, or if the data in the first data set is the path loss value, the data in the second data set is also the path loss value. Further, each piece of signal quality data in the second data set also has a corresponding MAC address and a corresponding timestamp. Using an example in which the data in the second data set is the downlink signal strength, the second data set includes downlink signal strength data of the plurality of terminal devices associated with the plurality of access points. With reference to the WLAN network shown in FIG. 1, for example, the first access point set includes the AP1 to the AP4. When only the AP1 is associated with the terminal devices STA1 to STA3, the second data set includes the downlink signal strength data of the STA1 to the STA3. When the AP1 or another AP is further associated with another STA, the second data set further includes the downlink signal strength data of the other STA. For one of the STAs, for example, downlink signal strength data of STA1 is arranged in a descending order as follows: −68, −70, −72, −74, −76, −78, −80, −82, −84, and −86. Further, for example, MAC addresses corresponding to the downlink signal strength data −68, −70, −72, −74, −76, −78, −80, −82, −84, and −86 of the STA1 are the MAC addresses of the STA1. For example, the timestamp corresponding to the downlink signal strength data −68 is t11, the timestamp corresponding to the downlink signal strength data −70 is t12, the timestamp corresponding to the downlink signal strength data −72 is t13, and so on. In other words, each piece of downlink signal strength data in the second data set is corresponding to a MAC address and a timestamp.

The target parameter may be an expected signal fulfillment rate, or may be an average SINR. This is not limited herein. When the first power configuration obtained based on the target parameter is applied to the first access point set, assuming that there is no loss, signal quality of a WLAN signal provided by each access point in the first access point set to the associated terminal device at different moments may be considered as meeting a requirement of the target parameter. It may be understood that the target parameter may be a default value, or may be manually set. For example, an administrator sets the target parameter through a human-computer interaction interface of the management device.

The first measurement parameter is determined based on the first data set. In other words, the first measurement parameter is determined based on actual signal quality data. The first measurement parameter indicates actual signal quality. For example, the first measurement parameter may be an average actual signal fulfillment rate, or may be an average actual SINR. This is not limited herein. Further, that the management device obtains the first measurement parameter based on the first data set includes the following steps.

S11: The management device obtains a quantity of pieces of data in the first data set that is greater than preset signal quality data based on the first data set.

S12. The management device determines that the first measurement parameter is a ratio of the quantity of pieces of data in the first data set that is greater than the preset signal quality data to a quantity of pieces of data in the first data set.

In an implementation, for signal quality data of each terminal device in the first data set, a plurality of actual signal fulfillment rates may be obtained through calculation. The management device may determine that the first measurement parameter is the average actual signal fulfillment rate by averaging the plurality of actual signal fulfillment rates obtained through calculation (for example, an arithmetic average value or a weighted average value). For example, in the WLAN network shown in FIG. 1, the downlink signal strength data of the STA1 associated with the AP1 is sorted in descending order as follows: −58, −60, −62, −64, −66, −68, −70, −72, −74, and −76 (that is, the quantity of pieces of downlink signal strength data of the STA1 associated with the AP1 is 10). It is assumed that the preset signal quality is −65 (the unit is also dBm), and in the downlink signal strength data of the STA1 associated with the AP1, there are 4 pieces of downlink signal strength data that are greater than the preset signal quality. The actual signal fulfillment rate corresponding to the STA1 associated with the AP1 is 4/10=40%. Similarly, for example, the management device determines, based on the downlink signal strength data and the preset signal quality data of the STA2 associated with the AP1, that an actual signal fulfillment rate corresponding to the STA2 associated with the AP1 is 50%. The management device determines, based on the downlink signal strength data and the preset signal quality data of the STA3 associated with the AP1, that an actual signal fulfillment rate corresponding to the STA3 associated with the AP1 is 60%. An arithmetic average is performed for the foregoing three actual signal fulfillment rates, and the actual signal fulfillment rate of the AP1 is 50%, that is, the first measurement parameter of the AP1 is 50%.

In another implementation, a plurality of actual SINRs may be obtained through calculation for the signal quality data of each terminal device in the first data set. For example, based on the following formula (1), the management device may obtain the plurality of actual SINRs through calculation.

$$SINR_i = 10lg\left[P_i^S/(P^N + P^I)\right] \quad (1)$$

$SINR_i$ represents an actual SINR corresponding to the $i^{th}$ piece of signal quality data in the first data set $$P_i^S$$

represents the $i^{th}$ piece of signal quality data. $P^N$ represents a noise power. $P^I$ represents an interference power. The noise power and the interference power may be preset fixed values, or may be measured (for example, the AP measures and reports the noise power and the interference power to the management device). This is not limited herein. Further, for example, for the signal quality data of the STA1 to the STA3 associated with the AP1, a plurality of actual SINRs that may be obtained through calculation based on the formula (1) are used. The plurality of actual SINRs are averaged (for example, arithmetic average or weighted average), and it may be determined that the first measurement parameter of the AP1 is an average actual SINR.

Optionally, before step 201, the method further includes step 201*a*: The management device receives the first data set from the first access point set. It should be noted that the management device may be an analyzer, or the management device may be a WLAN controller. This is not limited herein. When the management device is the analyzer, a manner in which the management device receives the first data set from the first access point set may be receiving the first data set from the WLAN controller, where the first data set is the first data set received by the WLAN controller from the first access point set.

202. The management device obtains an adjusted target parameter based on the first measurement parameter and the target parameter.

Further, that the management device obtains the adjusted target parameter based on the first measurement parameter and the target parameter may be that the management device obtains the adjusted target parameter based on the first measurement parameter, the target parameter, and the quantity of pieces of data in the first data set. The quantity of pieces of data in the first data set is related to a quantity of terminal devices associated with each access point in the first access point set. For example, when the quantity of terminal devices associated with each access point in the first access point set is relatively large, the terminal devices associated with each access point also report relatively large quantity of pieces of signal quality data (that is, a relatively large quantity of pieces of data in the first data set).

In this embodiment of this disclosure, a weighting coefficient is introduced with reference to a transfer learning algorithm, to obtain the adjusted target parameter based on the first measurement parameter and the target parameter. The weighting coefficient is obtained based on the quantity of pieces of data in the first data set. For example, for the AP1, when the quantity of pieces of signal quality data of the STA associated with the AP1 in the first data set is relatively large, the weighting coefficient $k_1$ of the AP1 is relatively large. When the quantity of pieces of signal quality data of the STA associated with the AP1 in the first data set is relatively small, the weighting coefficient $k_1$ of the AP1 is relatively small. Further, for the $j^{th}$ AP in the first access point set, an adjusted target parameter $$Q_j^L$$

of the $j^{th}$ AP meets the following formula (2):

$$Q_j^L = k_j Q_j^S + (1 - k_j) Q^T \quad (2)$$

$k_j$ represents the weighting coefficient of the $j^{th}$ AP, $$Q_j^S$$

represents the first measurement parameter of the $j^{th}$ AP, and $Q^T$ represents the target parameter. It can be learned from the formula (2) that the adjusted target parameter is obtained by performing linear weighting on the first measurement parameter and the target parameter based on the weighting coefficient.

Figure 3:
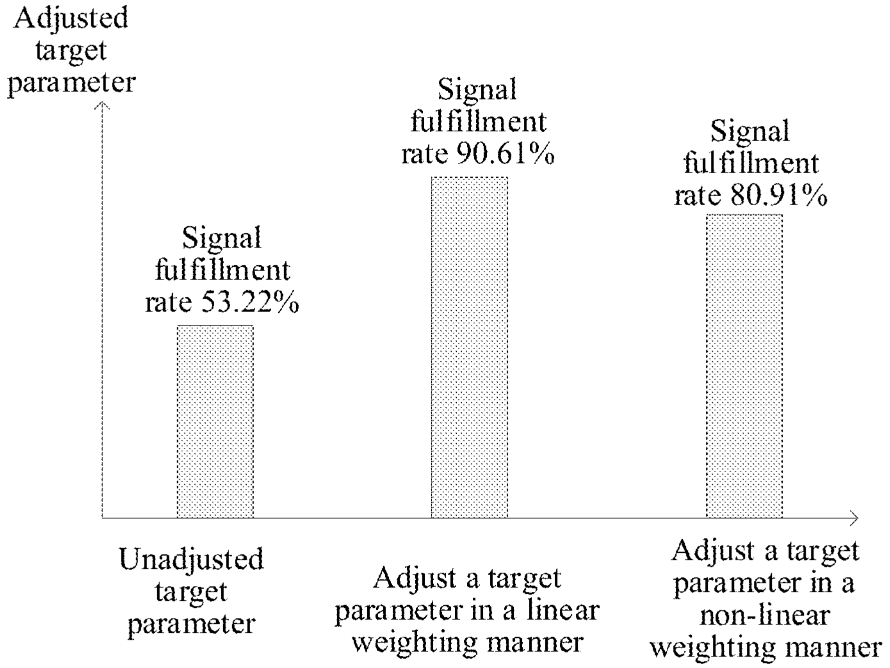
FIG. 3 is a schematic diagram of comparison of coverage performance obtained by adjusting a target parameter in different manners according to an embodiment of this disclosure.
Figure 4A:
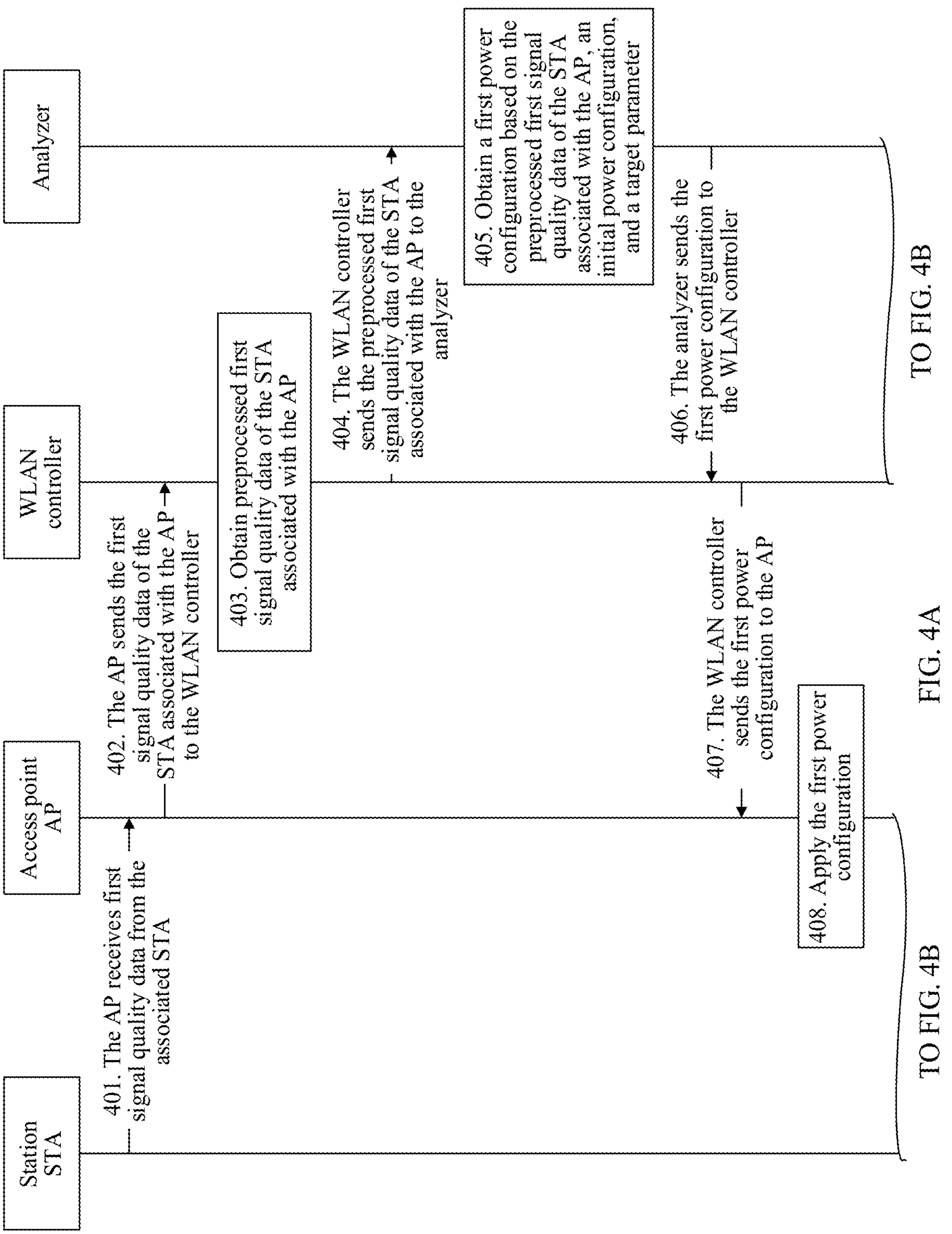
FIG. 4A, FIG. 4B, FIG. 4C, and FIG. 4D are schematic flowcharts of a power configuration method applied to a centralized WLAN network scenario according to an embodiment of this disclosure.
Figure 4B:
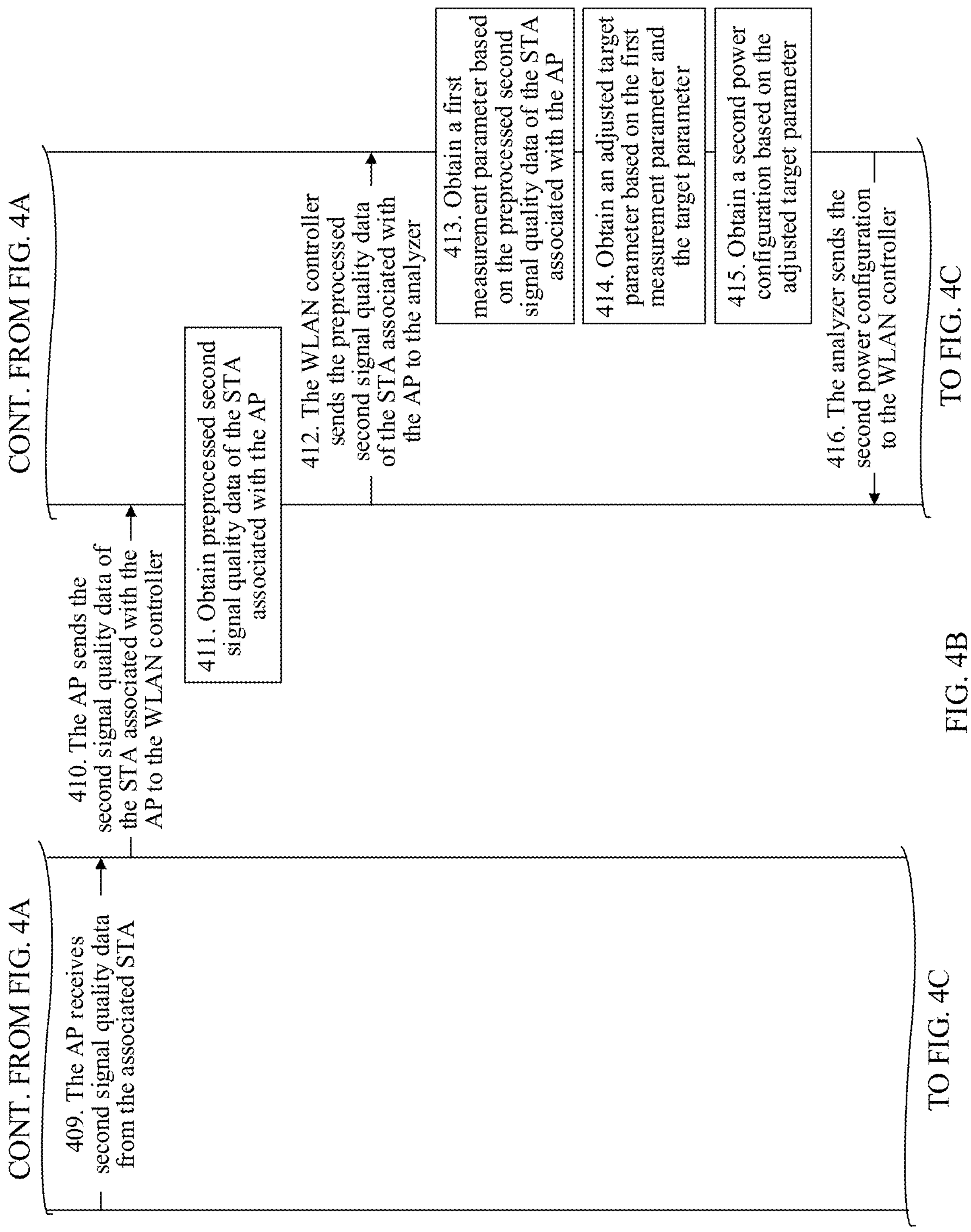
Figure 4C:
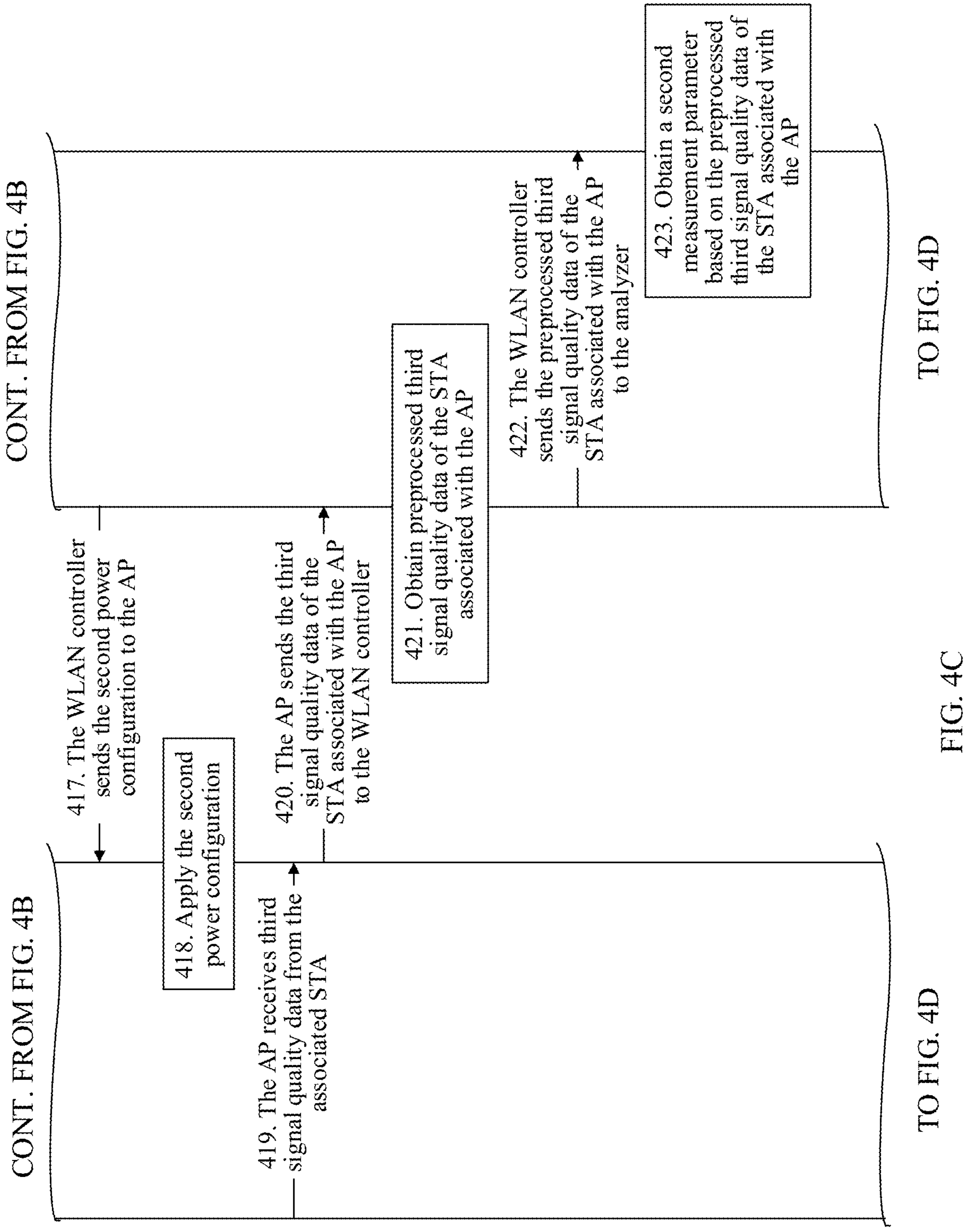
Figure 4D:
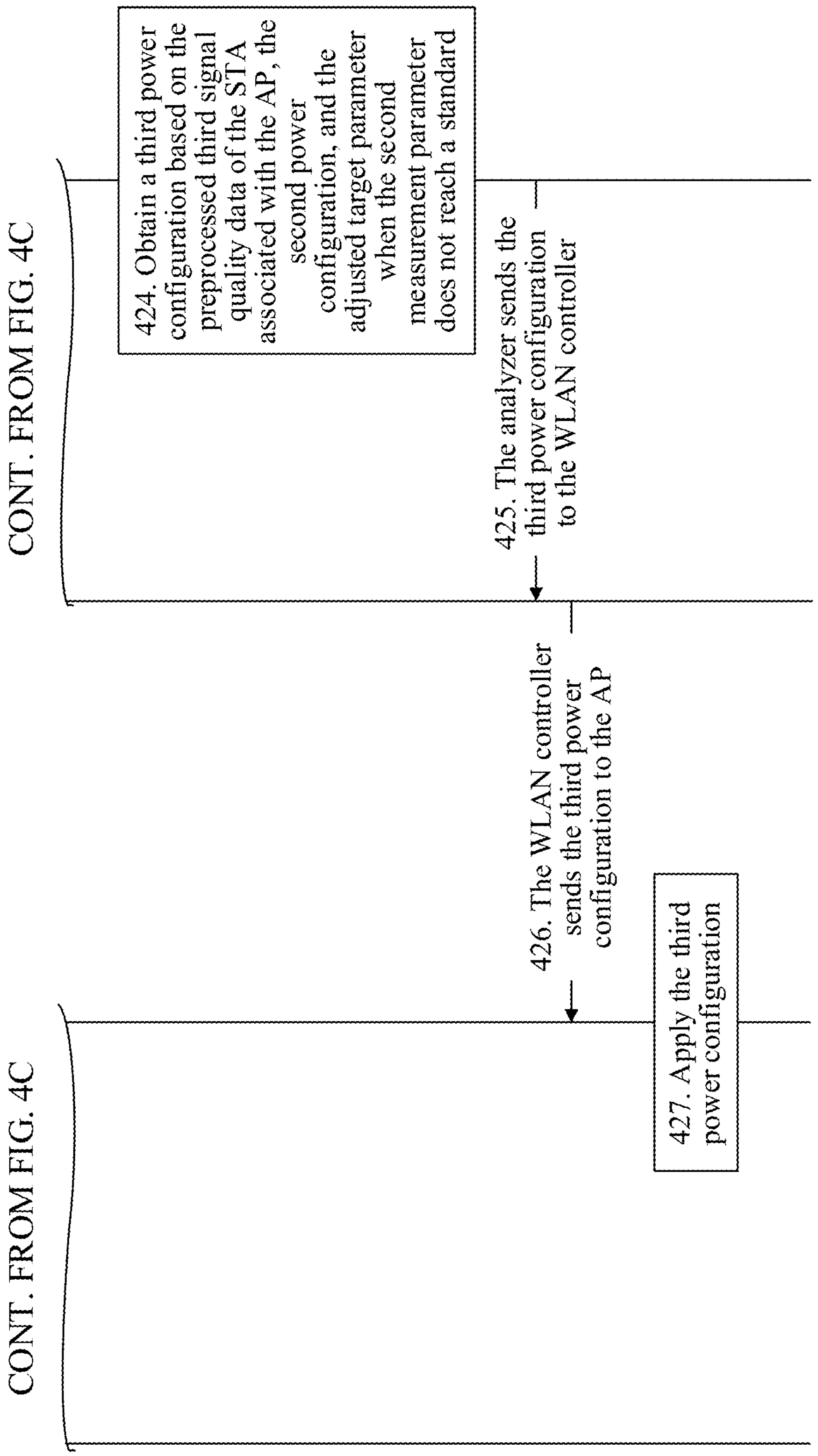

For example, FIG. 3 is a schematic diagram of comparison of coverage performance obtained by adjusting a target parameter in different manners based on measured data according to an embodiment of this disclosure. In FIG. 3, an example in which the target parameter is a signal fulfillment rate is used for representation by using a bar chart. It is assumed that the expected signal fulfillment rate preset by the management device is 90%. FIG. 3 shows that in this embodiment of this disclosure, an actual signal fulfillment rate obtained after the target parameter is adjusted in a linear weighting manner (for example, based on the formula (2)) is 90.61% (very close to the preset expected signal fulfillment rate). FIG. 3 further shows that an actual signal fulfillment rate obtained when the target parameter is not adjusted is 53.22%. FIG. 3 further shows that an actual signal fulfillment rate obtained after the target parameter is adjusted in a non-linear weighting manner is 80.91%. That is, in this embodiment of this disclosure, the signal fulfillment rate obtained after the target parameter is adjusted in the linear weighting manner is greater than the signal fulfillment rate obtained after the target parameter is adjusted in the non-linear weighting manner, and is even greater than the signal fulfillment rate obtained by actual measurement without any adjustment. Therefore, obtaining and applying the second power configuration based on the adjusted target parameter can improve network performance more efficiently.

It may be understood that, when the first measurement parameter is the average actual SINR, and the target parameter is the preset expected SINR, an adjusted SINR of each AP in the first access point set may also be obtained through calculation based on the foregoing formula (2).

203. The management device applies a second power configuration to the first access point set, where the second power configuration is obtained based on the adjusted target parameter.

Further, the second power configuration is obtained based on the path loss value corresponding to the adjusted target parameter and the preset signal quality. The second power configuration may be used to configure a transmit power of each access point in the first access point set (that is, the second power configuration includes a transmit power value of the access point), or may be used to adjust the transmit power of each access point in the first access point set (that is, the second power configuration includes an adjustment value of the transmit power of the access point).

For example, it is assumed that the second power configuration is used to configure the transmit power of each access point in the first access point set, and the signal quality data of the terminal device associated with each access point may be downlink signal strength data of a downlink signal received by the terminal device. Using the $j^{th}$ AP in the first access point set as an example, a relationship between the downlink signal strength data of the STA associated with the $j^{th}$ AP, the transmit power of the $j^{th}$ AP, and the path loss value corresponding to the adjusted target parameter of the $j^{th}$ AP meets a formula (3):

$$Y_j = P_j - X_j^{Q_j^L} \quad (3)$$

$Y_j$ represents the downlink signal strength data of the STA associated with the $j^{th}$ AP. $P_j$ represents the transmit power of the $j^{th}$ AP $$X_j^{Q_j^L}$$

represents the path loss value corresponding to the adjusted target parameter corresponding to the $j^{th}$ AP.

For example, it is assumed that 10 pieces of downlink signal strength data of the STA1 associated with the AP1 are sorted in descending order as follows: −58, −60, −62, −64, −66, −68, −70, −72, −74, and −76. It is assumed that the adjusted target parameter is 80%. Based on the adjusted target parameter 80%, the management device may obtain, from the 10 pieces of downlink signal strength data, the downlink signal strength that is −72 and that is ranked at the eighth bit (that is, corresponding to 80%) in descending order. It is assumed that the transmit power of the AP1 is 5 dBm. According to the foregoing formula (3), the management device may obtain the path loss value $$X_1^{Q_1^L} = P_1 - Y_1 = 5 - (-72) = 77$$

corresponding to the adjusted target parameter. Further, when the second power configuration is used to configure operating power of the AP1, based on the formula (3), the transmit power of the AP1 is a sum of the path loss value $$X_1^{Q_1^L}$$

corresponding to the adjusted target parameter of the AP1 and the preset signal quality $Y_{def}$ (the preset signal quality $Y_{def}$ is used to replace $Y_j$ in the formula (3) when the operating power of the AP1 under the second power configuration is calculated, and the unit is also dBm). The preset signal quality indicates expected WLAN signal quality provided by the access point to the associated terminal device in an actual WLAN application scenario. For example, for all access points in the first access point set, the preset signal quality $Y_{def}$ may be the same. For example, the preset signal quality is −65 dBm, and the transmit power of the AP1 under the second power configuration may be calculated as $$P_1' = X_1^{Q_1^L} + Y_{def} = 77 + (-65) = 12$$

based on the formula (3). Optionally, if the second power configuration is used to adjust the transmit power of each access point in the first access point set, the management device may obtain the adjustment value $$\Delta P_1 = P_1' - P_1 = 12 - 5 = 7$$

of the transmit power of the AP1 based on the transmit power 12 of the AP1 under the second power configuration.

That the management device applies the second power configuration to the first access point set may further be that the management device sends the second power configuration to each access point in the first access point set. For example, the AP in FIG. 1 is used as an example, and it is assumed that the management device is the WLAN controller for description. In an implementation, the WLAN controller sends transmit power values or adjustment values of transmit powers of all APs (that is, the AP1 to the AP4) under the second power configuration to each AP of the AP1 to the AP4 in the first access point set. In another implementation, the WLAN controller sends the transmit power value or the adjustment value of the transmit power of the AP under the second power configuration to the AP1 to the AP4 in the first access point set respectively. For example, the WLAN controller sends the transmit power value or the adjustment value of the transmit power of the AP1 under the second power configuration to the AP1. Correspondingly, each access point in the first access point set receives the second power configuration, and applies the second power configuration. For example, the AP1 receives the transmit power value of the AP1 under the second power configuration, and adjusts the transmit power of the AP1 to the transmit power value.

In an example, after the management device applies the second power configuration to the first access point set, if it is clear that a signal fulfillment rate (or an SINR) of one or more access points in the first access point set is in degradation compared with the signal fulfillment rate (or the SINR) corresponding to a previous detection moment (that is, a difference between the signal fulfillment rate (or the SINR) corresponding to the previous detection moment and a current signal fulfillment rate (or the SINR) is greater than a threshold), the management device triggers a local optimization operation. Further, the local optimization operation is performed after step 203, and includes the following steps.

S21. The management device obtains a second measurement parameter based on a third data set.

S22. The management device applies a third power configuration to a second access point set when the second measurement parameter does not reach a standard. The third power configuration is obtained based on the third data set, the second power configuration, and the adjusted target parameter. The first access point set includes the second access point set. The second access point set is less than or equal to the first access point set.

Further, the management device applies the second power configuration to each access point in the first access point set. Each access point in the first access point set obtains the signal quality data of the associated terminal device to obtain the third data set. For example, it is assumed that access points in the first access point set are the AP1 to the AP4. For the AP1, the AP1 sends the downlink signal to the STA1 to the STA3 by using the transmit power under the second power configuration. Correspondingly, the STA1 to the STA3 may receive a downlink signal of the AP1, and measure and obtain downlink signal strength data of the received downlink signal. The STA1 to the STA3 may further send the downlink signal strength data of the STA1 to the STA3 to the AP1. Correspondingly, the AP1 receives the downlink signal strength data of the STA1 to the STA3, and sends the downlink signal strength data of the STA1 to the STA3 to the management device. The management device adds the downlink signal strength data of the STA1 to the STA3 to the third data set. It may be understood that a type of data in the third data set is the same as a type of data in the first data set, for example, the RSSI or the path loss value. The third data set may include the signal quality data of the plurality of terminal devices. Further, the signal quality data of each terminal device may include signal quality data collected by the terminal device at different moments. For a specific example of the third data set, refer to the example description of the first data set in step 201. Details are not described herein again.

The second measurement parameter is determined based on the third data set. That is, the second measurement parameter is similar to the first measurement parameter, and is also determined based on the actual signal quality data. For example, the second measurement parameter may be the average actual signal fulfillment rate, or may be the average actual SINR. This is not limited herein. Further, that the management device obtains the second measurement parameter based on the third data set includes the following steps.

S31: The management device obtains a quantity of pieces of data in the third data set that is greater than the preset signal quality data based on the third data set.

S32: The management device determines that the second measurement parameter is a ratio of the quantity of pieces of data in the third data set that is greater than the preset signal quality data to a quantity of pieces of data in the third data set.

For example, the second measurement parameter is the actual signal fulfillment rate. For signal quality data of each terminal device in the third data set, a plurality of actual signal fulfillment rates may be obtained through calculation. The management device may determine that the second measurement parameter is the average actual signal fulfillment rate by averaging the plurality of actual signal fulfillment rates obtained through calculation (for example, the arithmetic average value or the weighted average value). For example, in the WLAN network shown in FIG. 1, the downlink signal strength data (data included in the third data set) of the STA1 associated with the AP1 under the second power configuration is sorted in descending order as follows: −54, −56, −58, −60, −62, −64, −66, −68, −70, and −72. It is assumed that the preset signal quality data is −65, and in the downlink signal strength data of the STA1 associated with the AP1, a quantity of pieces of data that is greater than the preset signal quality data is 6. The actual signal fulfillment rate corresponding to the STA1 associated with AP1 is 6/10=60%. Similarly, for example, the management device determines, based on the downlink signal strength data of the STA2 associated with the AP1 and the preset signal quality data, that the actual signal fulfillment rate corresponding to the STA2 associated with the AP1 is 70%. For example, the management device determines, based on the downlink signal strength data of the STA3 associated with the AP1 and the preset signal quality data, that the actual signal fulfillment rate corresponding to the STA3 associated with the AP1 is 70%. The arithmetic average is performed for the foregoing three actual signal fulfillment rates, and the actual signal fulfillment rate of the AP1 is 66.66%, that is, the second measurement parameter of the AP1 is 66.66%. It may be understood that, using an example in which the second measurement parameter is the actual SINR, the second measurement parameter may be calculated with reference to the formula (1) and the step of calculating the actual SINR in step 201. Details are not described herein again.

When the second measurement parameter is the signal fulfillment rate, that the second measurement parameter does not reach the standard may indicate that the signal fulfillment rate of the access point is less than the signal fulfillment rate of the access point at a previous detection moment, and a difference between the signal fulfillment rate of the access point at the previous detection moment and the signal fulfillment rate of the access point at the current moment is greater than or equal to a preset threshold. For example, it is assumed that the first access point set includes the AP1 to the AP4. The signal fulfillment rate of the AP1 at the current moment is 50%, and the signal fulfillment rate of the AP1 at the previous detection moment is 80%. Assuming that the preset threshold is 20%, the difference 30% between the signal fulfillment rate of the AP1 at the previous detection moment and the signal fulfillment rate of the AP1 at the current moment is greater than the preset threshold 20%. That is, the second measurement parameter of the AP1 does not reach the standard. A similar method may be used to determine whether the second measurement parameters of the AP2 to the AP4 reach the standard. It is assumed that the second measurement parameter of the AP2 and the second measurement parameter of the AP3 do not reach the standard, and the second measurement parameter of the AP4 reach the standard. In this case, the AP1 to the AP3 are access points in the second access point set.

Further, the second access point set further includes neighboring APs of an associated AP whose second measurement parameter does not reach the standard. For example, it is assumed that the neighboring APs of the AP1 include the AP2 and the AP3, the neighboring APs of the AP2 include the AP1 and the AP3, and the neighboring APs of the AP3 include the AP2 and the AP4. The second access point set includes the AP1 to the AP4. The first access point set includes the second access point set. The second access point set is less than or equal to the first access point set. The second access point set includes one or more access points. That the second access point set is less than or equal to the first access point set indicates that a quantity of access points in the second access point set is less than or equal to a quantity of access points in the first access point set.

The third power configuration is obtained based on the third data set, the second power configuration, and the adjusted target parameter. It may be understood that a specific calculation manner of the third power configuration is similar to that of the second power configuration. For example, the downlink signal strength data $$Y_1'$$

of the STA associated with the AP1 may be obtained based on the downlink signal strength data of the STA associated with the AP1 and the adjusted target parameter in the third data set. The path loss value $$X_1^{QL_1'} = P_1' - Y_1'$$

may be obtained through calculation based on the transmit power $$P_1'$$

of the AP1 under the second power configuration and with reference to the formula (3). Then, the transmit power $$P_1'' = X_1^{QL_1'} + Y_{def}$$

of the AP1 under the third power configuration is determined based on the path loss value $$X_1^{QL_1'}$$

and the preset signal quality $Y_{def}$. For a specific example, reference may be made to the description of calculating the transmit power of the AP1 under the second power configuration. Details are not described herein again. It may be understood that, the third power configuration may be used to configure the transmit power of the associated AP in the second access point set (that is, the third power configuration includes the transmit power value of the access point of the associated AP in the second access point set). The third power configuration may further be used to adjust the transmit power of the associated AP in the second access point set (that is, the third power configuration includes the adjustment value of the transmit power of the associated AP in the second access point set). Further, after the transmit power of the associated AP in the second access point set is configured, the transmit power of the neighboring AP in the second access point set may also be adaptively adjusted. For example, if the transmit power of the AP3 is increased, transmit power of a neighbor of the AP3, that is, the AP4 may also need to be increased or decreased. A specific adjustment manner may be, for example, obtaining the interference power of the AP3 to the AP4, and increasing or reducing the transmit power of the AP4 based on the interference power of the AP3 to the AP4.

In this embodiment of this disclosure, the management device may obtain the first measurement parameter based on the signal quality data reported by the terminal device associated with each access point in the first access point set, and adjust the target parameter based on the first measurement parameter, to obtain the adjusted target parameter and the second power configuration corresponding to the adjusted target parameter. In this solution, the management device adjusts a network optimization target based on the signal quality data of the WLAN signal that can be actually obtained by the terminal device, and further adjusts the power configuration, so that the determined power configuration can reach a requirement of the terminal device for WLAN signal quality, and can meet an expected network optimization target as much as possible.

The following describes a detailed procedure in which the power configuration method shown in FIG. 2 is applied to the WLAN scenario.

Figure 5:
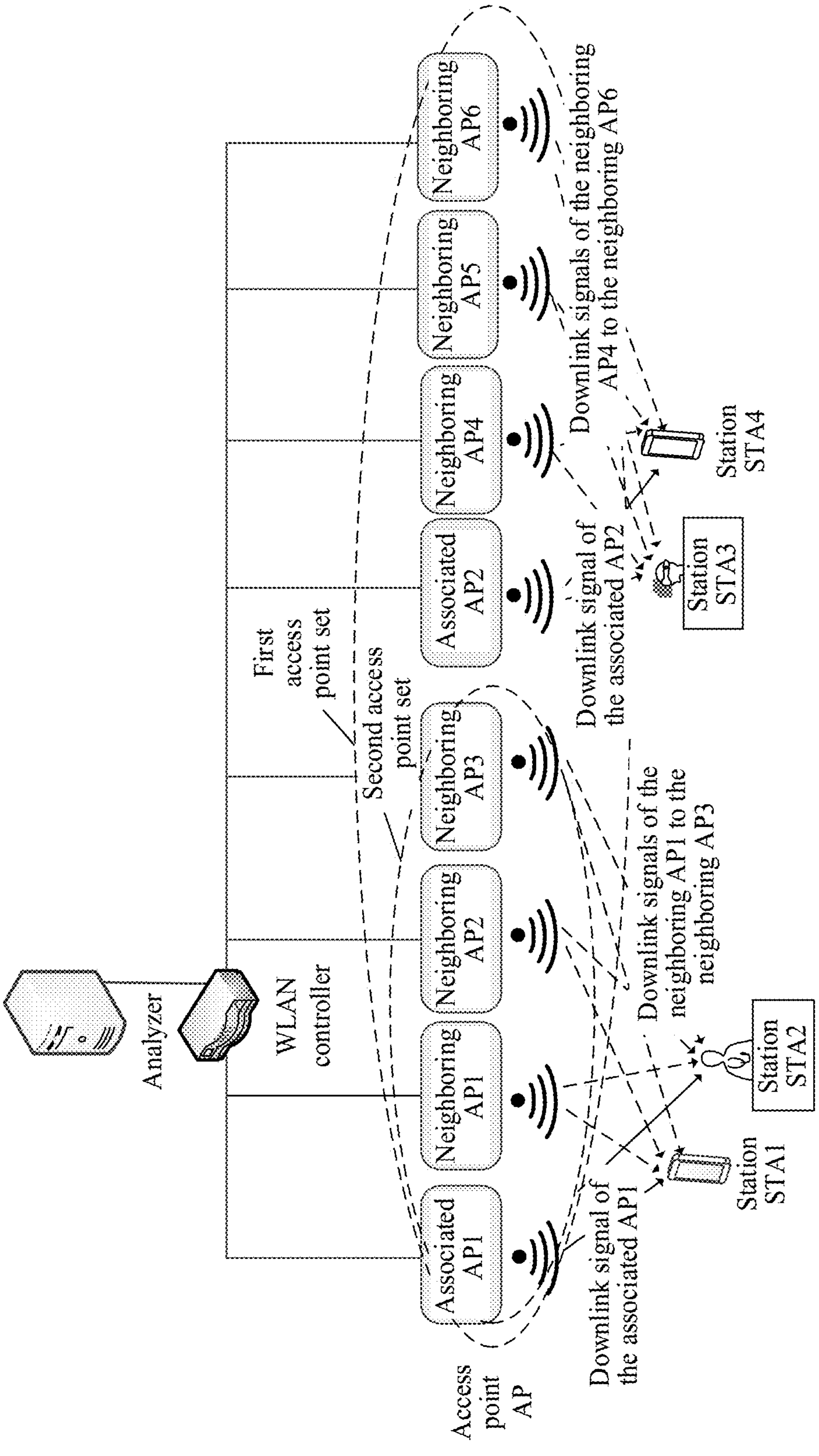
FIG. 5 is a schematic diagram of a centralized WLAN network scenario according to an embodiment of this disclosure.

FIG. 4A, FIG. 4B, FIG. 4C, and FIG. 4D are schematic flowcharts of a power configuration method applied to a centralized WLAN network scenario according to an embodiment of this disclosure. Refer to FIG. 5. The centralized WLAN network scenario shown in FIG. 5 includes an analyzer, a WLAN controller, a plurality of APs, and a plurality of STAs. In this embodiment, it is assumed that the management device is the analyzer. That is, the analyzer is configured to perform the foregoing power configuration method. The analyzer delivers power configurations to the WLAN controller, and the WLAN controller manages radio resources and network configurations of all APs. In this embodiment, it is assumed that the AP supports a fifth generation (5G) radio frequency (supporting both service transmission and neighbor scanning) and an 802.11k downlink measurement protocol. The neighbor scanning interval and duration can be configured based on actual network conditions. The method procedure shown in FIG. 4A, FIG. 4B, FIG. 4C, and FIG. 4D is implemented through interaction between the analyzer, the WLAN controller, the AP, and the STA, which includes the following steps.

401. The STA sends first signal quality data to an associated AP, and the AP receives the first signal quality data from an associated STA.

For example, the AP collects the first signal quality data of the associated STA by using the 802.11k protocol. The first signal quality data of the STA associated with the AP may include but is not limited to association data of the STA, neighboring data of the STA, and the like. The association data of the STA includes downlink signal strength data measured when the STA receives a downlink signal from the associated AP. The neighboring data of the STA includes downlink signal strength data measured when the STA receives a downlink signal from a neighboring AP of the associated AP. For example, in the WLAN network scenario shown in FIG. 5, the STA1 may measure downlink signal strength of an associated AP1, and may further measure downlink signal strength of a neighboring AP1 to a neighboring AP3. It may be understood that the AP in step 401 uses an initial power configuration, and the obtained first signal quality data of the associated STA includes a second data set. For descriptions of the initial power configuration and the second data set, refer to corresponding descriptions in step 201. Details are not described herein again.

402. The AP sends the first signal quality data of the STA associated with the AP to the WLAN controller, and the WLAN controller receives the first signal quality data of the STA associated with the AP.

403. The WLAN controller preprocesses the first signal quality data of the STA associated with the AP, to obtain the preprocessed first signal quality data of the STA associated with the AP.

Optionally, the WLAN controller may preprocess the first signal quality data of the STA associated with the AP. This can further improve data accuracy, and further improve coverage performance of the AP that performs power configuration based on the data.

For example, the first signal quality data of the STA associated with the AP includes the association data of the STA and the neighboring data of the STA. The association data of the STA includes a plurality of pieces of downlink signal strength data, and each piece of downlink signal strength data further corresponds to a MAC address and a timestamp. Similarly, the neighboring data of the STA also includes the plurality of pieces of downlink signal strength data, and each piece of downlink signal strength data further corresponds to a MAC address and a timestamp. The association data of the STA forms the second data set, and the neighboring data of the STA forms the fourth data set. Further, a type of data in the fourth data set is the same as a type of data in the second data set, for example, may be downlink signal strength or may be a path loss value. This is not limited herein.

Further, the WLAN controller may preprocess the first signal quality data of the STA associated with the AP. The objective of preprocessing is to remove sticky data. The sticky data refers to neighboring data of the STA that is greater than the association data of the STA at a same moment for the same STA. For example, if the signal quality data is the downlink signal strength, the sticky data is downlink signal strength that is of the neighboring AP and that is recorded by the STA in a first timestamp and that is greater than the downlink signal strength that is of the associated AP and that is recorded by the STA in the first timestamp. For example, that the WLAN controller preprocesses the first signal quality data of the STA associated with the AP may include the following three steps.

S41. Obtain first downlink signal strength data in a fourth data set, and a first MAC address and a first timestamp that are corresponding to the first downlink signal strength data.

The first downlink signal strength data is a maximum value of downlink signal strength data in the fourth data set.

S42. Obtain second downlink signal strength data of the second data set. The second downlink signal strength data is downlink signal strength data corresponding to the first MAC address and the first timestamp in the second data set.

S43. If the second downlink signal strength data is less than the first downlink signal strength data, update the second data set.

For example, a second data set and a fourth data set are used as an example. It is assumed that the second data set includes 11 pieces of downlink signal strength data, which are sorted in descending order as follows: −70, −70, −72, −74, −76, −78, −80, −82, −84, −86, and −88. It is assumed that the fourth data set includes 10 pieces of downlink signal strength data, which are sorted in descending order as follows: −99, −98, −97, −96, −95, −94, −93, −92, −90, and −87. It may be understood that each piece of data in the second data set and the fourth data set has a corresponding MAC address and a corresponding timestamp. The timestamp and the MAC address of each piece of data in the fourth data set may be the same as or different from the timestamp and the MAC address of each piece of data in the second data set. This is not limited herein. In a possible implementation, each piece of data in the second data set and the fourth data set corresponds to a same timestamp and a same MAC address (neighboring data of a same STA at a same time). For example, data in the fourth data set all correspond to the first timestamp and the first MAC address. The WLAN controller obtains first downlink signal strength data −87 in the fourth data set, and the first MAC address and the first timestamp that correspond to the first downlink signal strength data. It is assumed that the second downlink signal strength data corresponding to the first MAC address and the first timestamp in the second data set is −88. It can be learned, by comparing the first downlink signal strength data with the second downlink signal strength data, that the second downlink signal strength data −88 is less than the first downlink signal strength data −87, indicating that a data stickiness phenomenon exists. The WLAN controller may update the second data set. Further, the updated second data set does not include the second downlink signal strength data (that is, the second downlink signal strength data is deleted from the second data set, which is also referred to as data stickiness removal). For example, if the updated second data set does not include downlink signal strength data −88, the updated second data sets are −70, −70, −72, −74, −76, −78, −80, −82, −84, and −86.

Optionally, the WLAN controller may further supplement the second downlink signal strength data to association data of a corresponding neighboring AP (also referred to as data stickiness supplement). For example, it is assumed that the fourth data set includes downlink signal strength data of a neighboring AP1 measured by the STA2 when the AP associated with the STA2 is the associated AP1, and the WLAN controller supplements the second downlink signal strength data −87 in the fourth data set to the association data of the neighboring AP1.

404. The WLAN controller sends the preprocessed first signal quality data of the STA associated with the AP to the analyzer.

405. The analyzer obtains a first power configuration based on the preprocessed first signal quality data of the STA associated with the AP, an initial power configuration, and a target parameter.

For example, for an AP in the first access point set, the analyzer obtains the first power configuration of the AP based on an updated second data set (including first signal quality data of the STA associated with the AP), the initial power configuration, and the target parameter. It is assumed that the updated second data sets are −70, −70, −72, −74, −76, −78, −80, −82, −84, and −86. If the target parameter is 90%, and the obtained downlink signal strength that is ranked at the ninth bit (that is, corresponding to 90%) in the second data set in descending order is −84, that is, the first signal quality data is −84. Based on the formula (3), the first signal quality data of the STA associated with the AP and the transmit power of the AP, assuming that the transmit power of the AP is 5, the path loss value corresponding to the adjusted target parameter is 5−(−84)=89 Using an example in which preset signal quality is −65, based on the formula (3), the transmit power of the AP to be configured is obtained as 89+(−65)=24. If the first power configuration is used to configure the transmit power of the AP, the first power configuration indicates that the transmit power of the AP is 24. Optionally, if the first power configuration is used to adjust operating power of the AP, an adjustment value of the transmit power of the AP may be obtained as 24−5=19.

406. The analyzer sends the first power configuration to the WLAN controller, and the WLAN controller receives the first power configuration.

407. The WLAN controller sends the first power configuration to the AP, and the AP receives the first power configuration.

408. The AP applies the first power configuration.

For example, the AP sends a downlink signal to the associated STA by using the operating power configured in the first power configuration. The STA continues to measure downlink signal quality, and obtains downlink signal quality data.

409. The STA sends second signal quality data to the associated AP, and the AP receives the second signal quality data from the associated STA.

It may be understood that a specific implementation of step 409 is similar to that of step 401. For example, the AP collects the second signal quality data of the associated STA by using the 802.11k protocol. The AP in step 409 uses the first power configuration, and the obtained second signal quality data of the associated STA includes a first data set. For descriptions of the first data set, refer to corresponding descriptions in step 201. Details are not described herein again.

410. The AP sends the second signal quality data of the STA associated with the AP to the WLAN controller. Correspondingly, the WLAN controller receives the second signal quality data of the STA associated with the AP.

411. The WLAN controller preprocesses the second signal quality data of the STA associated with the AP, to obtain the preprocessed second signal quality data of the STA associated with the AP.

A manner in which the WLAN controller preprocesses the second signal quality data of the STA associated with the AP is the same as the preprocessing manner described in step 403. Details are not described herein again. The preprocessed second signal quality data of the STA associated with the AP includes the first data set and a fifth data set. The fifth data set includes the neighboring data of the STA that is obtained when the AP applies the first power configuration.

412. The WLAN controller sends the preprocessed second signal quality data of the STA associated with the AP to the analyzer.

413. The analyzer obtains a first measurement parameter based on the preprocessed second signal quality data of the STA associated with the AP.

For a specific implementation of step 413, refer to corresponding descriptions in step 201. For example, the analyzer obtains a quantity of pieces of data in the first data set that is greater than preset signal quality data based on the preprocessed second signal quality data (that is, the first data set) of the STA associated with the AP. Then, it is determined that the first measurement parameter is a ratio of the quantity of pieces of data in the first data set that is greater than the preset signal quality data to a quantity of pieces of data in the first data set. Details are not described herein again.

414. The analyzer obtains an adjusted target parameter based on the first measurement parameter and the target parameter.

For a specific implementation of step 414, refer to corresponding descriptions in step 202. For example, the analyzer obtains the adjusted target parameter based on the first measurement parameter, the target parameter, and the quantity of pieces of data in the first data set. Details are not described herein again.

415. The analyzer obtains a second power configuration based on the adjusted target parameter.

For a specific implementation of step 415, refer to corresponding descriptions in step 203. For example, the analyzer obtains a path loss value corresponding to the adjusted target parameter based on the adjusted target parameter and the first data set and with reference to the formula (3). Then, the second power configuration is obtained based on the path loss value corresponding to the adjusted target parameter and the preset signal quality. Details are not described herein again.

416. The analyzer sends the second power configuration to the WLAN controller.

417. The WLAN controller sends the second power configuration to the AP, and the AP receives the second power configuration.

418. The AP applies the second power configuration.

For example, the AP sends the downlink signal to the associated STA by using the operating power configured in the second power configuration. The STA continues to measure the downlink signal quality, and obtains the downlink signal quality data.

Optionally, after the second power configuration is applied to the first access point set, if it is clear that a signal fulfillment rate (or an SINR) of one or more access points in the first access point set is in degradation compared with a signal fulfillment rate (or an SINR) corresponding to a previous detection moment, the analyzer triggers a local optimization operation. That is, after step 417, the method may further include the following steps.

419. The STA sends third signal quality data to the associated AP, and the AP receives the third signal quality data from the associated STA.

It may be understood that a specific implementation of step 418 is similar to that of step 401. For example, the AP collects the third signal quality data of the associated STA by using the 802.11k protocol. The AP in step 419 uses the second power configuration, and the obtained third signal quality data of the associated STA includes a third data set. For descriptions of the third data set, refer to corresponding descriptions in the embodiment in FIG. 2. Details are not described herein again.

420. The AP sends third signal quality data of the STA associated with the AP to the WLAN controller, and the WLAN controller receives the third signal quality data of the STA associated with the AP.

421. The WLAN controller preprocesses the third signal quality data of the STA associated with the AP, to obtain the preprocessed third signal quality data of the STA associated with the AP.

A manner in which the WLAN controller preprocesses the third signal quality data of the STA associated with the AP is the same as the preprocessing manner described in step 403. Details are not described herein again. The preprocessed third signal quality data of the STA associated with the AP includes the third data set and a sixth data set. The sixth data set includes the neighboring data of the STA that is obtained when the AP applies the second power configuration.

422. The WLAN controller sends the preprocessed third signal quality data of the STA associated with the AP to the analyzer.

423. The analyzer obtains a second measurement parameter based on the preprocessed third signal quality data of the STA associated with the AP.

For a specific implementation of step 422, refer to the description of the step of obtaining the first measurement parameter in step 201. The specific implementation is similar. For example, the analyzer obtains a quantity of pieces of data in the third data set that is greater than preset signal quality data based on the preprocessed third signal quality data (that is, the third data set) of the STA associated with the AP. Then, it is determined that the second measurement parameter is a ratio of the quantity of pieces of data in the third data set that is greater than the preset signal quality data to a quantity of pieces of data in the third data set. Details are not described herein again.

424. The analyzer obtains a third power configuration based on the preprocessed third signal quality data of the STA associated with the AP, the second power configuration, and the adjusted target parameter when the second measurement parameter does not reach a standard.

For a specific implementation of step 423, refer to the description of the step of obtaining the third power configuration in the embodiment in FIG. 2. For example, the analyzer obtains downlink signal strength of a terminal device associated with the AP based on the preprocessed third signal quality data of the STA associated with the AP and the adjusted target parameter. The transmit power of the AP is obtained based on the second power configuration. In addition, a path loss value corresponding to the adjusted target parameter corresponding to the AP is obtained based on the downlink signal strength of the terminal device associated with the AP and the transmit power of the AP. Then, the transmit power of the AP in the third power configuration is determined based on the formula (3) and the preset signal quality. Details are not described herein again.

425. The analyzer sends the third power configuration to the WLAN controller, and the WLAN controller receives the third power configuration.

426. The WLAN controller sends the third power configuration to the AP in the second access point set, and the AP in the second access point set receives the third power configuration.

For example, the WLAN controller sends third power configurations of all APs to all APs in the second access point set. Alternatively, the WLAN controller separately sends the third power configuration of the AP to all APs in the second access point set.

427. The AP in the second access point set applies the third power configuration.

For example, the AP in the second access point set sends the downlink signal to the associated STA by using the transmit power configured in the third power configuration. The STA continues to measure the downlink signal quality, and obtains the downlink signal quality data.

Figure 6:
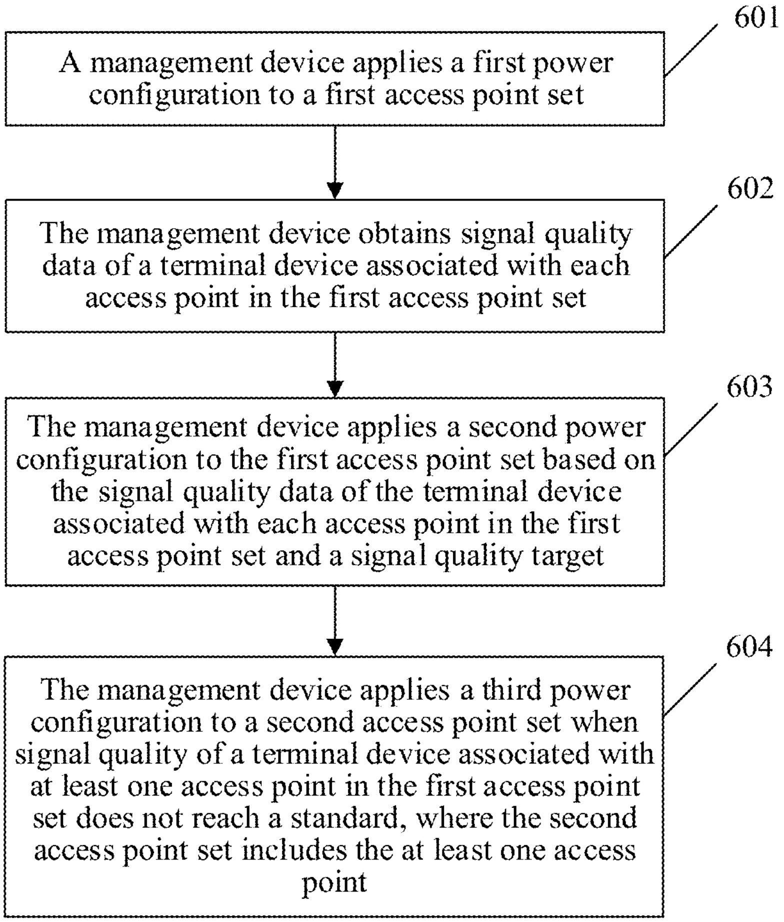
FIG. 6 is a schematic flowchart of another power configuration method according to an embodiment of this disclosure.

FIG. 6 is a schematic flowchart of another power configuration method according to an embodiment of this disclosure. The method is performed by a management device, and includes the following steps.

601. The management device applies a first power configuration to a first access point set.

For example, the first power configuration is obtained based on a target parameter. The target parameter may be obtained by the management device through a human-computer interaction interface. For a specific implementation, refer to related descriptions of the first power configuration and the target parameter in the embodiment in FIG. 2. Details are not described herein again.

602: The management device obtains signal quality data of a terminal device associated with each access point in the first access point set.

For example, the management device obtains the first data set. The first data set includes the signal quality data of the terminal device associated with each access point in the first access point set when the first power configuration is applied to the first access point set. For a specific implementation, refer to related descriptions of the first data set in the embodiment of FIG. 2. Details are not described herein again.

603. The management device applies a second power configuration to the first access point set based on the signal quality data of the terminal device associated with each access point in the first access point set.

The management device obtains the second power configuration based on the signal quality data of the terminal device associated with each access point in the first access point set.

For example, the management device obtains the second power configuration based on the signal quality data of the terminal device associated with each access point in the first access point set and a signal quality target. For example, the signal quality target may be the adjusted target parameter described in the embodiment in FIG. 2, or may be the target parameter. This is not limited herein. The management device then applies the second power configuration to the first access point set. For a specific implementation, refer to related descriptions of the second power configuration in the embodiment in FIG. 2. Details are not described herein again.

604. The management device applies a third power configuration to a second access point set when signal quality of a terminal device associated with at least one access point in the first access point set does not reach a standard. The second access point set includes at least one access point.

For example, when the signal quality of at least one access point associated with the terminal device in the first access point set does not reach the standard, it indicates that the first access point set includes at least one access point, and the signal quality data of the terminal device associated with the access point is less than preset signal quality data. The management device applies the third power configuration to the second access point set. For a specific implementation, refer to related descriptions of the third power configuration in the embodiment in FIG. 2. Details are not described herein again.

In this embodiment of this disclosure, the management device may obtain the second power configuration based on signal quality data (which may be considered as actual signal quality data) reported by the terminal device associated with each access point in the first access point set. Based on quality of a WLAN signal that can be actually obtained by the terminal device, the second power configuration can reach a requirement of the terminal device for a WLAN signal in an actual WLAN application scenario, and can also meet an expected network optimization target as much as possible. In addition, when it is clear that signal quality of a terminal device associated with an access point in the first access point set is in degradation, the transmit power of the access point whose the signal quality is in clear degradation may be adjusted. In this way, local network optimization is implemented, so that a network configuration is more flexible.

To implement functions in the method provided in embodiments of this disclosure, the apparatus or the device provided in embodiments of this disclosure may include a hardware structure and/or a software module, and the foregoing functions are implemented in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions. In this embodiment of this disclosure, module division is an example, and is merely a logical function division. In actual implementations, another division manner may be used. In addition, function modules in embodiments of this disclosure may be integrated into one processor, or each of the modules may exist alone physically, or two or more modules are integrated into one module. The integrated module may be implemented in a form of hardware, or may be implemented in a form of a software functional module.

Figure 7:
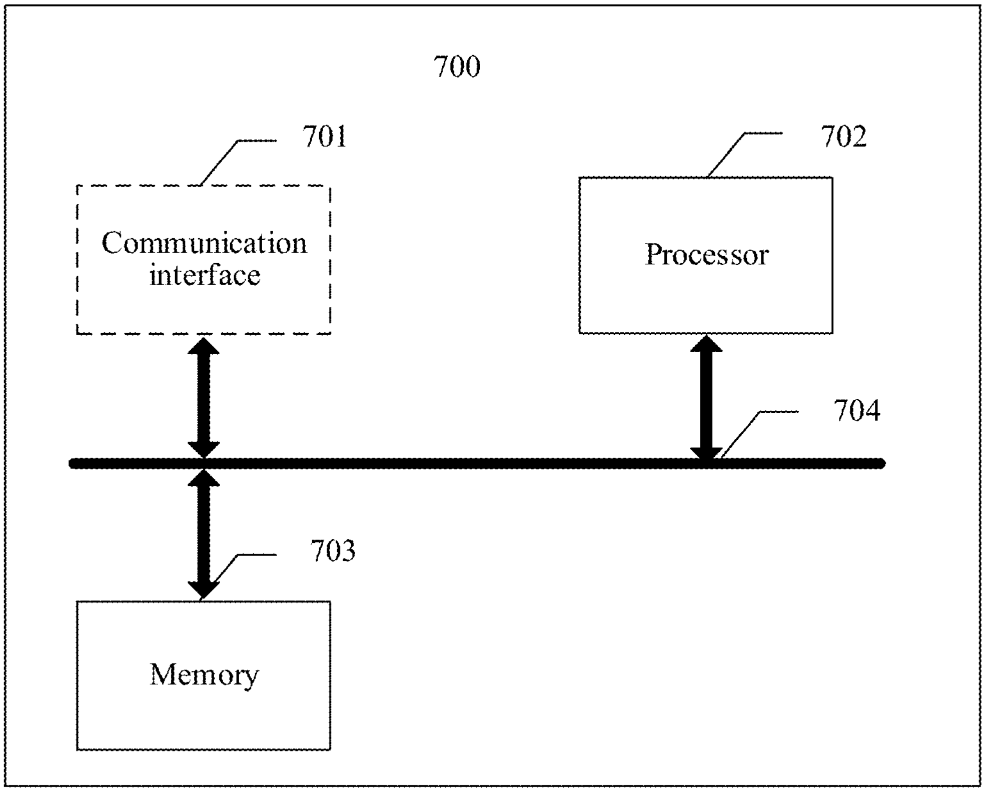
FIG. 7 is a schematic diagram of an electronic device according to an embodiment of this disclosure.

FIG. 7 shows an electronic device 700 according to an embodiment of this disclosure. The electronic device 700 is configured to implement the power configuration method in the foregoing method embodiment. The electronic device may also be a chip system. The electronic device 700 includes a communication interface 701. The communication interface may be, for example, a transceiver, an interface, a bus, a circuit, or an apparatus that can implement a sending and receiving function. The communication interface 701 is configured to communicate with another device through a transmission medium, so that the electronic device 700 can communicate with the other device. For example, the other device may be an access point. The electronic device 700 further includes at least one processor 702 configured to implement a function of the management device in the power configuration method provided in embodiments of this disclosure. The processor 702 and the communication interface 701 are configured to implement the methods performed by the management device in the method embodiments corresponding to FIG. 2 to FIG. 6.

For example, the communication interface 701 is configured to obtain signal quality data of a terminal device associated with each access point in a first access point set. The processor 702 is configured to apply a first power configuration to the first access point set. The processor 702 is further configured to apply a second power configuration to the first access point set based on the signal quality data of the terminal device associated with each access point in the first access point set and a signal quality target. The processor 702 is further configured to apply a third power configuration to the second access point set when signal quality of a terminal device associated with at least one access point in the first access point set does not reach a standard. The second access point set includes the at least one access point.

For specific execution procedures of the communication interface 701 and the processor 702 in this example, refer to detailed descriptions of operations performed by the management device in the method examples shown in FIG. 2 to FIG. 5. Details are not described herein again. In this example, steps performed by the communication interface 701 and the processor 702 can better match a signal quality requirement of the terminal device. The target parameter (for example, the target parameter is an expected signal fulfillment rate) is adjusted based on actual coverage experience of the AP and a first measurement parameter, to obtain an adjusted target parameter, which helps further optimize power configuration of the AP.

For example, the communication interface 701 is configured to obtain signal quality data of the terminal device associated with each access point in the first access point set when the first power configuration is applied to the first access point set. The processor 702 is configured to apply the second power configuration to the first access point set based on the signal quality data of the terminal device associated with each access point in the first access point set and the signal quality target. The processor 702 is further configured to apply the third power configuration to the second access point set when the signal quality of the terminal device associated with at least one access point in the first access point set does not reach the standard, where the second access point set includes the at least one access point.

For the specific execution procedures of the communication interface 701 and the processor 702 in this example, refer to detailed descriptions of the operations performed by the management device in the method example shown in FIG. 6. Details are not described herein again. In this example, when signal quality of terminal devices associated with some APs in a network does not reach the standard, the steps performed by the communication interface 701 and the processor 702 can better match the signal quality requirement of the terminal device. Further, in this solution, the power configuration may locally optimize the power configuration, thereby implementing a quick response to power configuration optimization.

The electronic device 700 may further include at least one memory 703 configured to store program instructions and/or data. The memory 703 is coupled to the processor 702. The coupling in this embodiment is an indirect coupling or a communication connection between apparatuses, units, or modules, may be in an electrical form, a mechanical form, or another form, and is used for information exchange between the apparatuses, the units, or the modules. The processor 702 may cooperate with the memory 703. The processor 702 may execute the program instructions stored in the memory 703.

In this embodiment of this disclosure, a specific connection medium between the communication interface 701, the processor 702, and the memory 703 is not limited. For example, in FIG. 7, the memory 703, the processor 702, and the communication interface 701 are connected through a bus 704. The bus is represented by a thick line in FIG. 7, which is merely an example for description and is not limited thereto. Buses may be classified into an address bus, a data bus, a control bus, and the like. For ease of representation, only one thick line is used to represent the bus in FIG. 7, but this does not mean that there is only one bus or only one type of bus.

In embodiments of this disclosure, the processor may be a general-purpose processor, a digital signal processor, an application-specific integrated circuit, a field programmable gate array or another programmable logic device, a discrete gate or a transistor logic device, or a discrete hardware component. The processor may implement or perform the methods, steps, and logical block diagrams disclosed in embodiments of this disclosure. The general-purpose processor may be a microprocessor or the like. The steps of the method disclosed with reference to embodiments of this disclosure may be directly performed by a hardware processor, or may be performed by using a combination of hardware in the processor and a software module.

In this embodiment of this disclosure, the memory may be a nonvolatile memory, for example, a hard disk drive (HDD) or a solid-state drive (SSD). The memory may be a volatile memory, for example, a random-access memory (RAM). The memory is any other medium that can carry or store expected program code in a form of instructions or a data structure and that can be accessed by a computer, but is not limited thereto. The memory in this embodiment of this disclosure may alternatively be a circuit or any other apparatus that can implement a storage function, and is configured to store program instructions and/or data.

Figure 8:
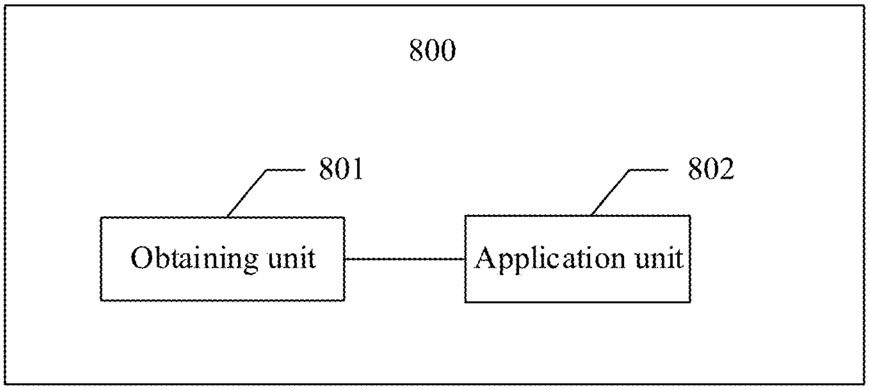
FIG. 8 is a schematic diagram of a power configuration apparatus according to an embodiment of this disclosure.

FIG. 8 shows a power configuration apparatus 800 according to an embodiment of this disclosure. The power configuration apparatus may be the management device in the foregoing method embodiments, or may be an apparatus in the management device, or may be an apparatus that can be used in matching with the management device. In an implementation, the power configuration apparatus may include modules that are in a one-to-one correspondence with the methods/operations/steps/actions described in the examples corresponding to FIG. 2 to FIG. 6. The module may be a hardware circuit or software, or may be implemented by the hardware circuit in combination with the software. In an implementation, the apparatus may include an obtaining unit 801 and an application unit 802.

For example, the obtaining unit 801 is configured to obtain a first measurement parameter based on a first data set. The first data set includes signal quality data of a terminal device associated with each access point in the first access point set when a first power configuration is applied to the first access point set. The first power configuration is obtained based on a target parameter. The obtaining unit 801 is further configured to obtain an adjusted target parameter based on the first measurement parameter and the target parameter. The application unit 802 is configured to apply a second power configuration to the first access point set. The second power configuration is obtained based on the adjusted target parameter.

For specific execution procedures of the obtaining unit 801 and the application unit 802 in this example, refer to detailed descriptions of operations performed by the management device in the method examples shown in FIG. 2 to FIG. 5. Details are not described herein again. In this example, the steps performed by the obtaining unit 801 and the application unit 802 can better match a signal quality requirement of the terminal device. The target parameter (for example, the target parameter is an expected signal fulfillment rate) is adjusted based on actual coverage experience of the AP and a first measurement parameter, to obtain an adjusted target parameter, which helps further optimize power configuration of the AP.

For example, the obtaining unit 801 is configured to obtain signal quality data of the terminal device associated with each access point in the first access point set when the first power configuration is applied to the first access point set. The application unit 802 is configured to apply the second power configuration to the first access point set according to the signal quality data and the signal quality target of the terminal device associated with each access point in the first access point set. The application unit 802 is further configured to apply a third power configuration to a second access point set when signal quality of a terminal device associated with at least one access point in the first access point set does not reach a standard. The second access point set includes at least one access point.

For the specific execution procedures of the obtaining unit 801 and the application unit 802 in this example, refer to detailed descriptions of operations performed by the management device in the method example shown in FIG. 6. Details are not described herein again. In this example, when signal quality of terminal devices associated with some APs in the network does not reach the standard, steps performed by the obtaining unit 801 and the application unit 802 can implement local power configuration optimization, thereby implementing quick response to power configuration optimization.

An embodiment of this disclosure provides a computer-readable storage medium, and the computer-readable storage medium stores a program or an instruction. When the program or the instruction is run on a computer, the computer is enabled to perform the power configuration methods shown in FIG. 2 to FIG. 6.

An embodiment of this disclosure provides a chip or a chip system. The chip or the chip system includes at least one processor and at least one interface. The interface is interconnected to the at least one processor through a line. The at least one processor is configured to run a computer program or instructions, to perform the power configuration method shown in FIG. 2 to FIG. 6.

The interface in the chip may be an input/output interface, a pin, a circuit, or the like.

The chip system in the foregoing aspect may be a system-on-chip (SOC), a baseband chip, or the like. The baseband chip may include a processor, a channel encoder, a digital signal processor, a modem, an interface module, and the like.

In an implementation, the chip or the chip system described above further includes at least one memory, and the at least one memory stores instructions. The memory may be a storage unit inside the chip, for example, a register or a cache. Alternatively, the memory may be a storage unit (for example, a read-only memory (ROM) or a RAM) of the chip.

All or a part of the technical solutions provided in embodiments of this disclosure may be implemented by software, hardware, firmware, or any combination thereof. When the software is used to implement the embodiments, all or a part of embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, a network device, a terminal device, or another programmable apparatus. The computer instructions may be stored in a computer-readable storage medium, or transmitted from one computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) manner or a wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium, or the like.

In this disclosure, on the premise that there is no logical contradiction, various embodiments may be mutually referenced. For example, methods and/or terms between method embodiments may be mutually referenced. For example, functions and/or terms between apparatus embodiments may be mutually referenced. For example, functions and/or terms between the apparatus embodiments and the method embodiments may be mutually referenced.

It is clear that, a person skilled in the art can make various modifications and variations to this disclosure without departing from the scope of this disclosure. In this way, this disclosure is intended to cover these modifications and variations of this disclosure provided that they fall within the scope of protection defined by the following claims and their equivalent technologies.

What is claimed is:

1. A method comprising:

obtaining a first measurement parameter based on a first data set, wherein the first data set comprises first signal quality data of terminal devices associated with each access point in a first access point set when a first power configuration is applied to the first access point set, and wherein the first power configuration is obtained based on a target parameter;

obtaining an adjusted target parameter based on the first measurement parameter and the target parameter; and applying a second power configuration to the first access point set, wherein the second power configuration is obtained based on the adjusted target parameter.

2. The method of claim 1, wherein the first power configuration is further obtained based on a second data set and an initial power configuration, and wherein the second data set comprises second signal quality data of the terminal devices associated with each access point in the first access point set when the initial power configuration is applied to the first access point set.

3. The method of claim 1, wherein the first measurement parameter indicates a ratio of a first quantity of pieces of data in the first data set that is greater than preset signal quality data to a second quantity of pieces of data in the first data set.

4. The method of claim 1, further comprising further obtaining the adjusted target parameter based on a quantity of pieces of data in the first data set.

5. The method of claim 4, wherein the adjusted target parameter is obtained by performing linear weighting on the first measurement parameter and the target parameter based on a weighting coefficient, and wherein the weighting coefficient is obtained based on the quantity of the pieces.

6. The method of claim 1, wherein the second power configuration is obtained based on a path loss value corresponding to the adjusted target parameter and preset signal quality data.

7. The method of claim 1, comprising:

obtaining a second measurement parameter based on a second data set, wherein the second data set comprises second signal quality data of the terminal devices associated with each access point in the first access point set when the second power configuration is applied to the first access point set; and applying a third power configuration to a second access point set when the second measurement parameter does not reach a standard, wherein the first access point set comprises the second access point set, wherein the second access point set is less than or equal to the first access point set, wherein the second access point set comprises one or more access points, and wherein the third power configuration is obtained based on the second data set, the second power configuration, and the adjusted target parameter.

8. The method of claim 1, further comprising obtaining the target parameter through a human-computer interaction interface.

9. A power configuration method comprising:

applying a first power configuration to a first access point set;

obtaining first signal quality data of terminal devices associated with each access point in the first access point set;

applying a second power configuration to the first access point set based on the first signal quality data; and applying a third power configuration to a second access point set when second signal quality of a first terminal device in the terminal devices and associated with at least one access point in the first access point set does not reach a standard, wherein the second access point set comprises the at least one access point.

10. An apparatus comprising:

at least one memory configured to store instructions; and at least one processor coupled to the at least one memory and configured to execute the instructions to cause the apparatus to:

obtain a first measurement parameter based on a first data set, wherein the first data set comprises first signal quality data of terminal devices associated with each access point in a first access point set when a first power configuration is applied to the first access point set, and wherein the first power configuration is obtained based on a target parameter, wherein:

obtain an adjusted target parameter based on the first measurement parameter and the target parameter; and apply a second power configuration to the first access point set, wherein the second power configuration is obtained based on the adjusted target parameter.

11. The apparatus of claim 10, wherein the first power configuration is further obtained based on a second data set and an initial power configuration, and wherein the second data set comprises second signal quality data of the terminal devices associated with each access point in the first access point set when the initial power configuration is applied to the first access point set.

12. The apparatus of claim 10, wherein the first measurement parameter indicates a ratio of a first quantity of pieces of data in the first data set that is greater than preset signal quality data to a second quantity of pieces of data in the first data set.

13. The apparatus of claim 10, wherein the at least one processor is further configured to execute the instructions to cause the apparatus to further obtain the adjusted target parameter based on a quantity of the data in the first data set.

14. The apparatus of claim 13, wherein the adjusted target parameter is obtained by performing linear weighting on the first measurement parameter and the target parameter based on a weighting coefficient, and wherein the weighting coefficient is obtained based on the quantity of the pieces.

15. The apparatus of claim 10, wherein the second power configuration is obtained based on a path loss value corresponding to the adjusted target parameter and preset signal quality data.

16. The apparatus of claim 10, wherein the at least one processor is further configured to execute the instructions to cause the apparatus to:

obtain a second measurement parameter based on a second data set, wherein the second data set comprises second signal quality data of the terminal devices associated with each access point in the first access point set when the second power configuration is applied to the first access point set; and apply a third power configuration to a second access point set when the second measurement parameter does not reach a standard, wherein the first access point set comprises the second access point set, wherein the second access point set is less than or equal to the first access point set, wherein the second access point set comprises one or more access points, and wherein the third power configuration is obtained based on the second data set, the second power configuration, and the adjusted target parameter.

17. The apparatus of claim 10, wherein the at least one processor is further configured to execute the instructions to cause the apparatus to obtain the target parameter through a human-computer interaction interface.

18. The apparatus of claim 10, wherein each piece of data comprised in the first data set further comprises a media access control (MAC) address of the terminal device and a timestamp.

19. The apparatus of claim 11, wherein the at least one processor is further configured to execute the instructions to cause the apparatus to obtain the initial power configuration based on a path loss topology relationship of each access point in the first access point set.

20. The method of claim 1, wherein each piece of data comprised in the first data set further comprises a media access control (MAC) address of the terminal device and a timestamp.

* * * * *